United States Patent [19]

Weder

[11] Patent Number: 5,701,720
[45] Date of Patent: Dec. 30, 1997

[54] OPTICAL EFFECT MATERIAL AND METHODS

[75] Inventor: Donald E. Weder, Highland, Ill.

[73] Assignee: Southpac Trust International, Inc.

[21] Appl. No.: 454,474

[22] Filed: May 30, 1995

Related U.S. Application Data

[63] Continuation of Ser. No. 179,057, Jan. 7, 1994, Pat. No. 5,576,089, which is a continuation-in-part of Ser. No. 968,798, Oct. 30, 1992, Pat. No. 5,369,934, which is a continuation of Ser. No. 865,563, Apr. 9, 1992, Pat. No. 5,245,814, which is a continuation of Ser. No. 649,379, Jan. 31, 1991, Pat. No. 5,111,638, which is a continuation of Ser. No. 249,761, Sep. 26, 1988, abandoned, which is a continuation-in-part of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned.

[51] Int. Cl.$^6$ .............. B65B 11/02; B65B 11/48; B65B 11/56; B65B 25/02
[52] U.S. Cl. .............. 53/397; 53/399; 53/410; 53/464; 53/465
[58] Field of Search .............. 53/397, 399, 462, 53/465, 415, 419, 464, 49, 410, 411, 412, 390, 456, 459; 206/423, 460; 229/87.01; 47/72, 41.01; 428/13, 142

[56] References Cited

U.S. PATENT DOCUMENTS

| | | | |
|---|---|---|---|
| Re. 31,780 | 12/1984 | Cooper et al. | 428/212 |
| 2,240,072 | 4/1941 | Hodgdon et al. | 428/142 |
| 2,774,187 | 12/1956 | Smithers | 47/41 |
| 2,989,828 | 6/1961 | Warp | 53/390 |
| 3,094,810 | 6/1963 | Kalpin | 47/37 |
| 3,150,031 | 9/1964 | Powell | 428/142 |
| 3,231,645 | 1/1966 | Bolomey | 264/73 |
| 3,271,922 | 9/1966 | Wallerstein et al. | 53/399 |
| 3,376,666 | 4/1968 | Leonard | 47/41 |
| 3,400,036 | 9/1968 | Hemrick et al. | 428/142 |
| 3,431,706 | 3/1969 | Stuck | 53/390 |
| 3,475,191 | 10/1969 | Lodge et al. | 428/142 |
| 3,481,663 | 12/1969 | Greenstein | 350/163 |
| 3,508,372 | 4/1970 | Wallerstein et al. | 53/399 |
| 3,549,405 | 12/1970 | Schrenk et al. | 428/142 |
| 3,554,434 | 1/1971 | Anderson | 229/55 |
| 3,616,192 | 10/1971 | Sinclair | 428/13 |
| 3,749,629 | 7/1973 | Andrews et al. | 428/142 X |
| 3,865,664 | 2/1975 | Neumann | 428/486 X |
| 3,922,440 | 11/1975 | Wegwerth et al. | 428/437 |
| 3,962,503 | 6/1976 | Crawford | 53/397 X |
| 4,162,343 | 7/1979 | Wilcox et al. | 428/212 |
| 4,189,868 | 2/1980 | Tymchuck et al. | 47/84 |
| 4,333,267 | 6/1982 | Witte | 47/84 |
| 4,400,910 | 8/1983 | Koudstaal et al. | 47/84 |
| 4,413,725 | 11/1983 | Bruno et al. | 206/45 |
| 4,520,064 | 5/1985 | Kanzelberger | 428/13 X |
| 4,530,863 | 7/1985 | Seeger | 428/13 |
| 4,699,820 | 10/1987 | Herr, Jr. et al. | 428/142 |
| 4,786,533 | 11/1988 | Crass et al. | 428/13 |
| 4,801,014 | 1/1989 | Meadows | 206/423 |
| 4,963,218 | 10/1990 | Rainey | 428/486 X |
| 5,008,143 | 4/1991 | Armanini | 428/207 |
| 5,089,318 | 2/1992 | Shetty et al. | 428/212 |
| 5,111,638 | 5/1992 | Weder | 53/397 |

(List continued on next page.)

FOREIGN PATENT DOCUMENTS 1204647  9/1970  United Kingdom.

OTHER PUBLICATIONS

Exhibit A—The Simple Solution For Those Peak vol. Periods, Speed Cover® 1989©, 4 pages, a brochure published by Highland Supply, 1111 Sixth St., Highland, IL 62249.

Exhibit B—Speed Sheets® And Speed Rolls, ©1990, 2 pages, a brochure published by Highland Supply, 1111 Sixth St., Highland, IL 62249.

*Primary Examiner*—Horace M. Culver
*Attorney, Agent, or Firm*—Dunlap & Codding, P.C.

[57] ABSTRACT

An optical effect material used for making shredded, flaked, die-cut and sheets of decorative materials. The optical effect material comprises an iridescent sheet and a light transmitting material connected together. Methods for using an optical effect material.

15 Claims, 12 Drawing Sheets

U.S. PATENT DOCUMENTS

| | | | |
|---|---|---|---|
| 5,147,706 | 9/1992 | Kingman | 428/195 |
| 5,154,765 | 10/1992 | Armanini | 106/401 |
| 5,204,160 | 4/1993 | Rouser | 428/142 X |
| 5,228,234 | 7/1993 | de Klerk et al. | 47/41 |
| 5,235,782 | 8/1993 | Landau | 47/72 |
| 5,245,814 | 9/1993 | Weder | 53/465 X |
| 5,307,605 | 5/1994 | Straeter | 53/397 |
| 5,335,476 | 8/1994 | Weder | 53/399 X |
| 5,335,477 | 8/1994 | Weder | 53/465 X |
| 5,347,789 | 9/1994 | Weder | 53/465 X |
| 5,369,934 | 12/1994 | Weder | 53/399 X |
| 5,381,642 | 1/1995 | Weder et al. | 53/465 X |
| 5,388,386 | 2/1995 | Weder | 53/397 |
| 5,408,803 | 4/1995 | Weder et al. | 53/465 X |
| 5,428,939 | 7/1995 | Weder et al. | 53/465 X |
| 5,448,875 | 9/1995 | Weder | 53/465 X |
| 5,456,056 | 10/1995 | Weder | 53/397 |
| 5,465,551 | 11/1995 | Weder | 53/397 |
| 5,467,573 | 11/1995 | Weder et al. | 53/397 |
| 5,509,251 | 4/1996 | Weder et al. | 53/465 X |
| 5,526,632 | 6/1996 | Weder et al. | 53/399 X |
| 5,533,319 | 7/1996 | Weder | 53/465 X |
| 5,533,320 | 7/1996 | Weder | 53/465 X |
| 5,537,799 | 7/1996 | Straeter | 53/397 |
| 5,537,800 | 7/1996 | Weder | 53/397 |

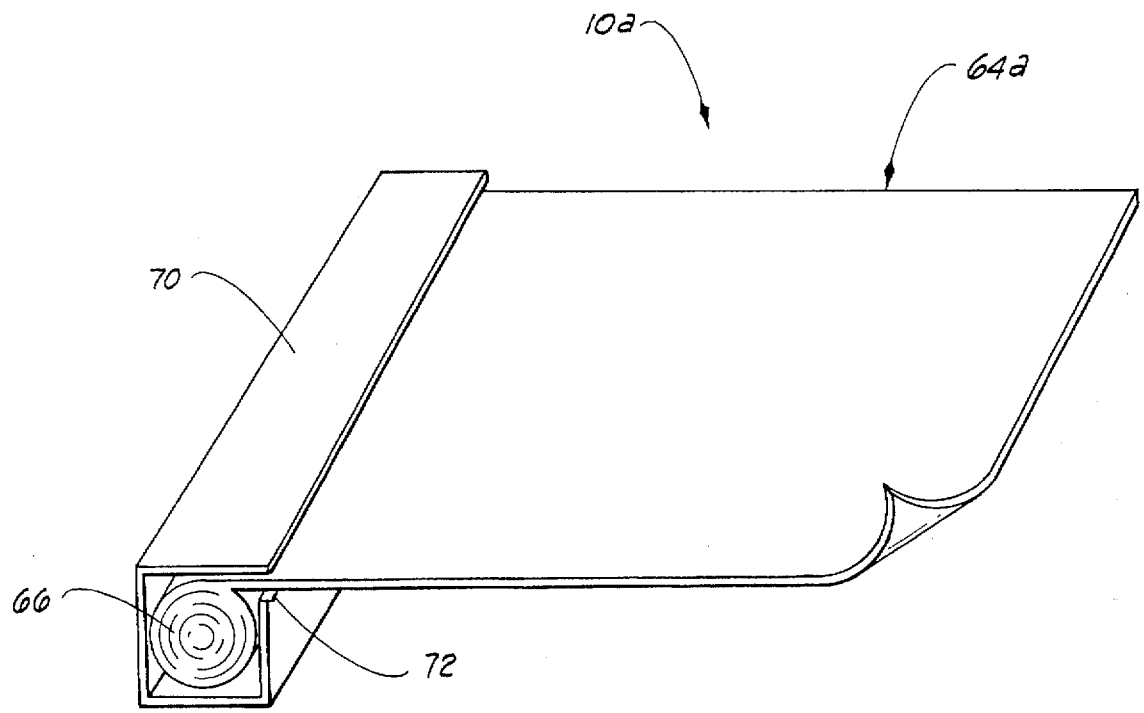
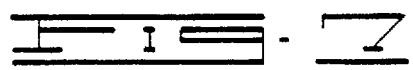
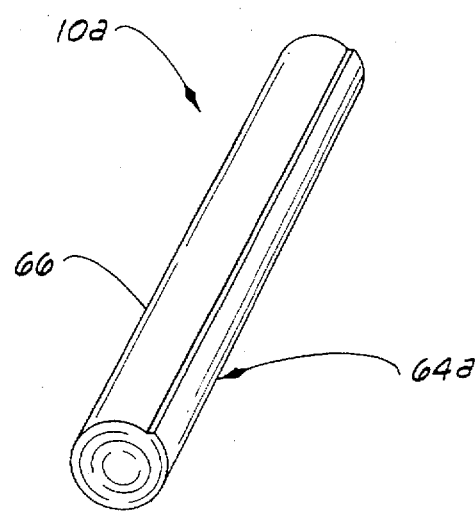
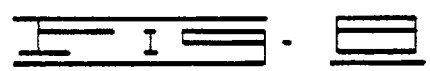

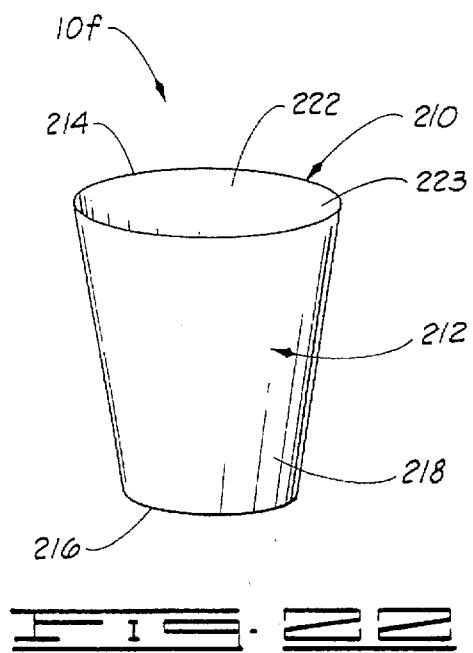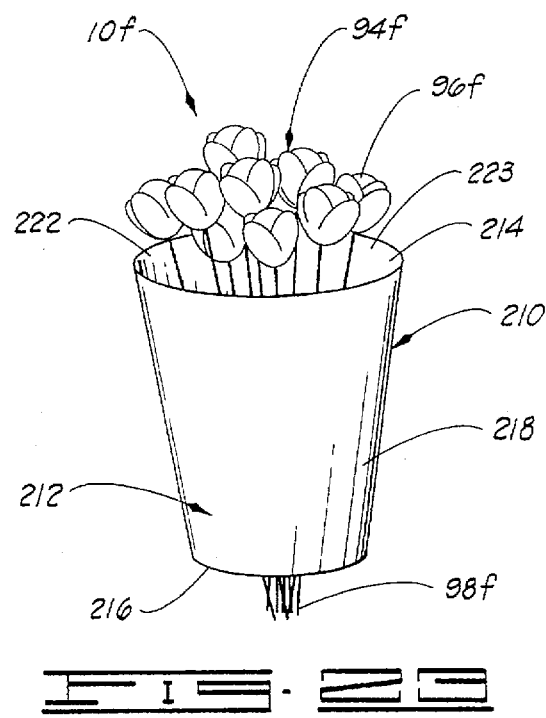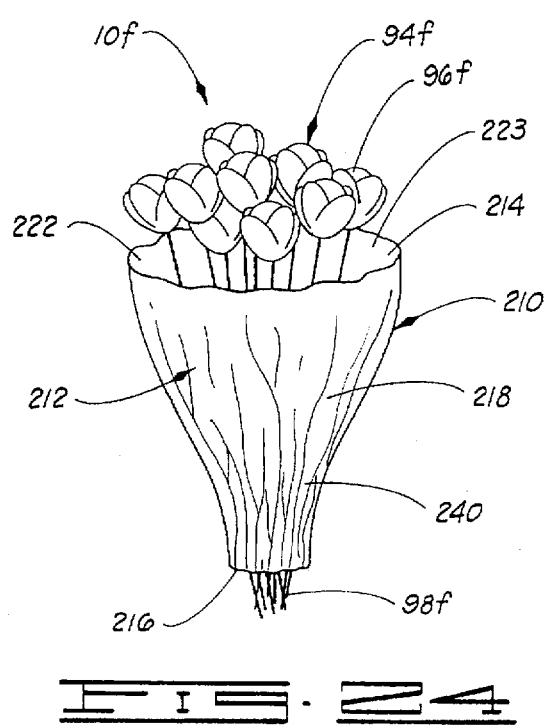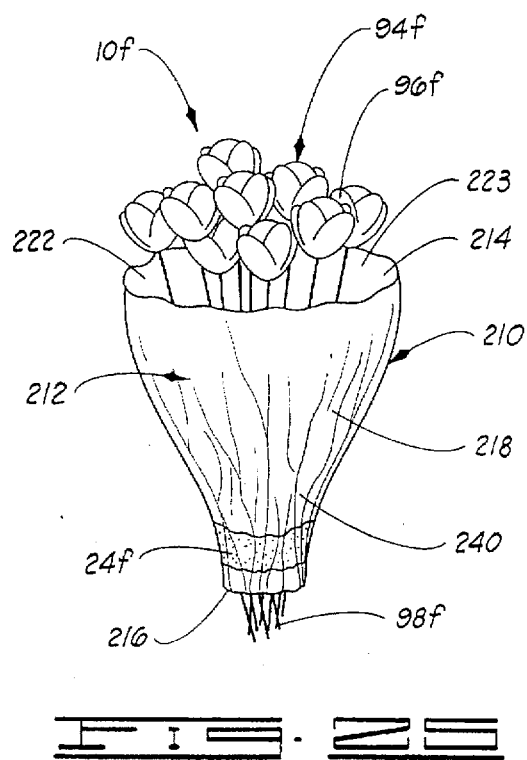

5,701,720

1

OPTICAL EFFECT MATERIAL AND METHODS

CROSS REFERENCE TO RELATED APPLICATIONS

This application is a continuation of U.S. Ser. No. 08/179,057, filed Jan. 7, 1994, entitled OPTICAL EFFECT MATERIAL AND METHODS, now U.S. Pat. No. 5,576,089; which is a continuation-in-part of application U.S. Ser. No. 07/968,798, filed Oct. 30, 1992, entitled METHOD AND APPARATUS FOR COVERING PORTIONS OF AN OBJECT WITH A SHEET OF MATERIAL HAVING A PRESSURE SENSITIVE ADHESIVE COATING APPLIED TO AT LEAST A PORTION OF AT LEAST ONE SURFACE OF THE SHEET OF MATERIAL, now U.S. Pat. No. 5,369,934; which is a continuation of U.S. Ser. No. 07/865,563, filed Apr. 9, 1992, entitled METHODS FOR WRAPPING A FLORAL GROUPING, now U.S. Pat. No. 5,245,814; which is a continuation of U.S. Ser. No. 07/649,379, filed Jan. 31, 1991, entitled METHOD FOR WRAPPING AN OBJECT WITH A MATERIAL HAVING PRESSURE SENSITIVE ADHESIVE THEREON, now U.S. Pat. No. 5,111,638; which is a continuation of U.S. Ser. No. 249,761, filed Sep. 26, 1988, entitled METHOD FOR WRAPPING AN OBJECT WITH A MATERIAL HAVING PRESSURE SENSITIVE ADHESIVE THEREON, now abandoned; which is a continuation-in-part of U.S. Ser. No. 219,083, filed Jul. 13, 1988, entitled ARTICLE FORMING SYSTEM, now U.S. Pat. No. 4,897,031; which is a continuation of U.S. Ser. No. 004,275, filed Jan. 5, 1987, entitled ARTICLE FORMING SYSTEM, now U.S. Pat. No. 4,773,182; which is a continuation of U.S. Ser. No. 613,080, filed May 22, 1984, entitled ARTICLE FORMING SYSTEM, now abandoned.

FIELD OF THE INVENTION

This invention relates to decorative material and particularly, optical effect material used to both wrap objects and as decorative shredded material or cut material, and methods of using same.

BRIEF DESCRIPTION OF THE DRAWINGS

FIG. 7 is a perspective view showing a roll of optical effect material wherein the roll of optical effect material is disposed in a dispenser for separating the roll into separate sheets of optical effect material and dispensing the separate sheets of optical effect material from the roll of optical effect material.

FIG. 8 is a perspective view showing a roll of optical effect material wherein the roll comprises a single sheet of optical effect material.

FIG. 22 is a perspective view of another embodiment of the present invention, showing a wrapper comprising a sleeve for wrapping a floral grouping, constructed in accordance with the optical effect material of the present invention.

FIG. 23 is a perspective view of the wrapper of FIG. 22 but showing the floral grouping disposed inside of the wrapper with the bloom portion near the first end and the stem portion extending from the second end.

3

FIG. 24 is a perspective view of the wrapper of FIG. 23 but showing the wrapper crimped about the stem portion of the floral grouping, the crimped portion forming overlapping folds.

FIG. 25 is a perspective view of a modified wrapper similar to the wrapper shown in FIG. 24 but having the bonding material disposed on the outer surface of the sleeve, and showing the wrapper crimped about the stem portion of the floral grouping, the crimped portion forming overlapping folds.

Figure 26:
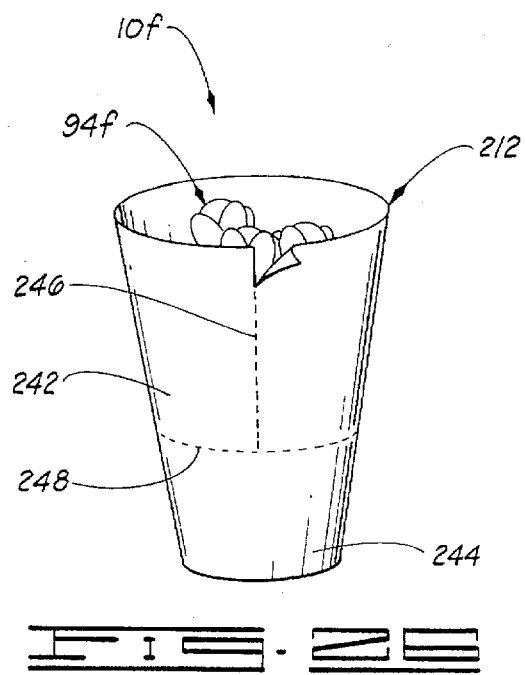

FIG. 26 is a perspective view of another embodiment of the present invention, showing a wrapper comprising a sleeve for covering a flower pot, the vertical perforations torn at the upper portion of the sleeve.

Figure 27:
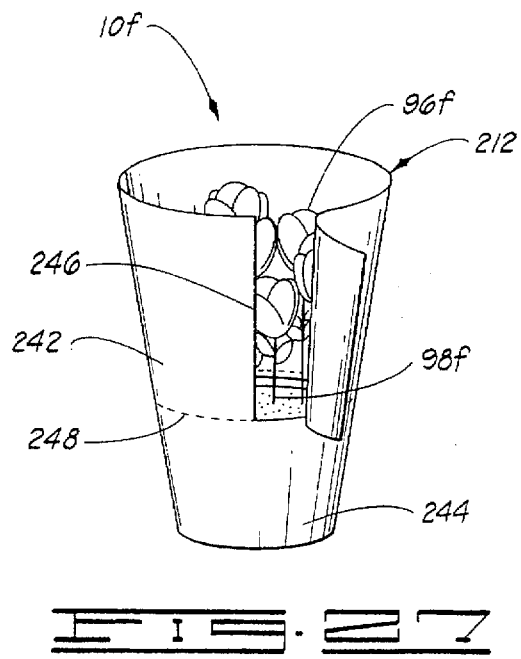

FIG. 27 is a perspective view of the wrapper of FIG. 26, but showing the vertical perforation torn open and the circumferential perforations being torn.

Figure 28:
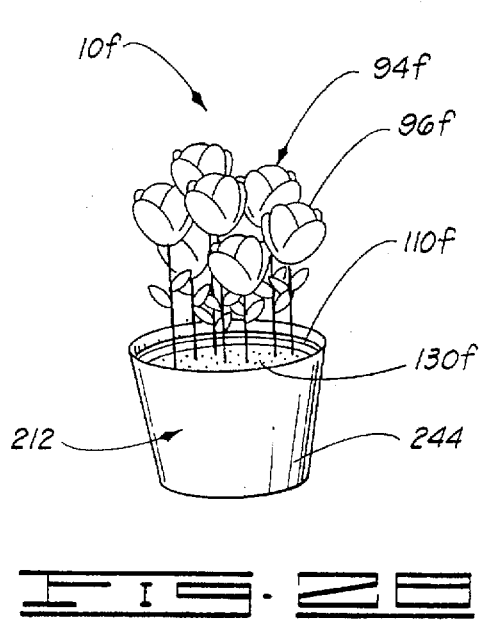

FIG. 28 is a perspective view of the wrapper of FIGS. 26 and 27, but showing the upper portion torn away and the remaining lower portion of the sleeve forming a decorative cover about the pot.

Figure 29:
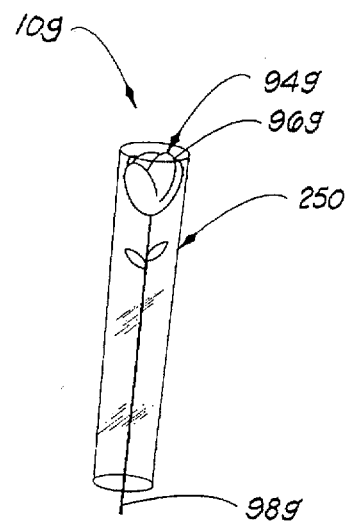

FIG. 29 is a perspective view of still another embodiment of the present invention, showing a wrapper for a floral grouping, wherein the wrapper is sized to wrap a single bloom and single stem.

DESCRIPTION OF THE PREFERRED EMBODIMENTS

The Embodiments of FIGS. 1–5

Iridescent material is frequently used in confetti, glitter, flakes, tinsel, labels, decals, stickers, sequins, decorative shredded material, such as, but not by way of limitation, decorative grasses (such decorative shredded material also being called herein "filamentary portions"), and other decorative gift and floral wrapping material, because of its changing, multicolor effect. This optical effect is expensive to produce. In some products, such as, but not by way of limitation, confetti, glitter, and decorative grasses, the items are sold by weight, and not volume. Therefore, it is expensive to supply the quantity of iridescent decorative material to meet the desired weight of these products.

The present invention describes a method which is significantly less expensive (that is, approximately one-third less expensive) to supply the same weight of iridescent material for such items as confetti, flakes, such as, for example, decorative metallic flakes, glitter, decorative flakes, and other very small decorative die-cut items, such as sequins, stars, and the like, and decorative shredded material, such as, but not by way of limitation, decorative grasses, and other decorative materials sold by weight rather than volume (the forgoing decorative items also termed herein "decorative elements"). The present invention contemplates laminating a light transmitting material such as, but not by way of limitation, a clear plastic sheet of material, or a tinted material, or a metallic material, to the iridescent material. Use of a light transmitting material permits the iridescent qualities of the iridescent sheet of material to be transmitted and seen through the light transmitting material. Lamination of the light transmitting material to the iridescent material increases the weight of the resulting product while mainlining a selected volume range. The light transmitting material is much less expensive to produce or purchase than is a similar weight of iridescent material. In this manner, the manufacturer is provided a considerable cost savings, while maintaining the quality and standards of the products, as expected by consumers.

4

Similarly, lamination of light transmitting material to iridescent material is contemplated for providing floral wrapping material and for providing material to wrap flower pots or plant containers (or for providing preformed flower pot covers and other decorative covers). Differing effects are provided via the lamination technique, combined with other techniques, such as, but not by way of limitation, embossing the iridescent material and/or the light transmitting material and or other materials prior to lamination and then laminating two or more of the materials together. Additional characteristics of the iridescent material, the light transmitting material, and other relevant materials are described herein, and present a variety of interesting, unusual, and decorative effects when two or more different materials are laminated together. Such a combination maintains the iridescent characteristics while creating additional interesting effects hereby creating a decorative optical effect material. Shown in FIG. 1 and designated therein by the general reference numeral 10 is an optical effect material. The material comprises a first sheet of material 11 and a second sheet of material.

Figure 1:
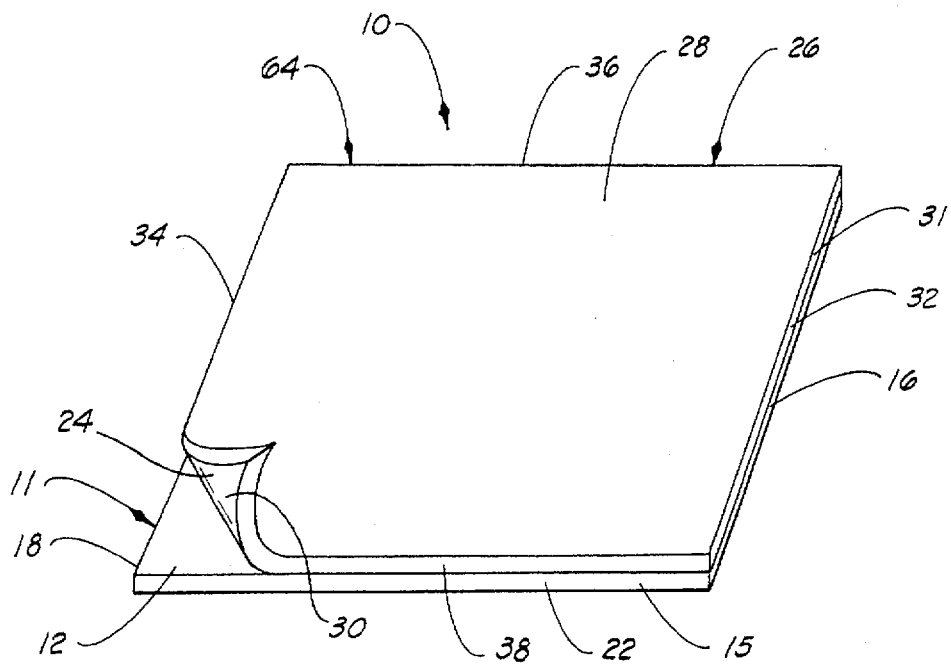
FIG. 1 is a perspective view of the optical effect material constructed in accordance with the present invention, showing a bonding material disposed on the lower surface of the second sheet of material which connects the second sheet of material to the adjacent first sheet of material to form the optical effect material.
Figure 2:
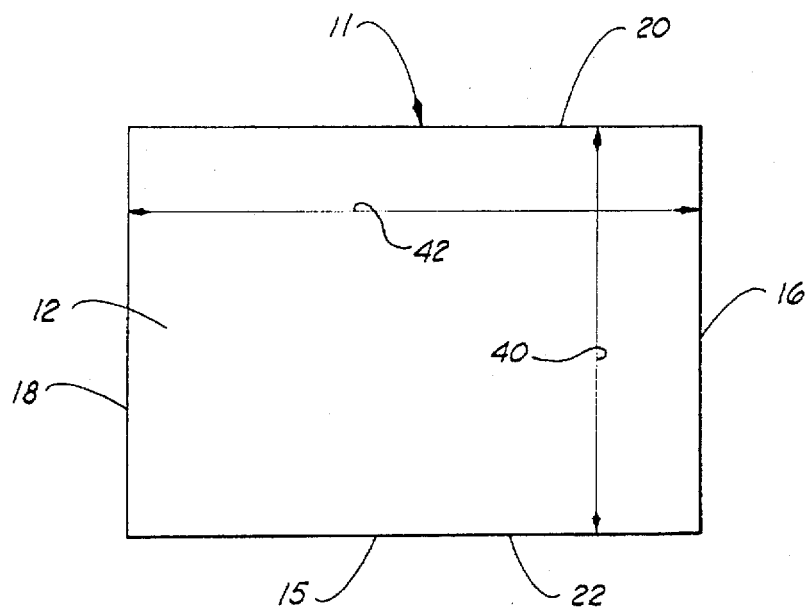
FIG. 2 is a top plan view of the upper surface of the first sheet of material constructed in accordance with the present invention, the upper and lower surfaces being identical.

The first sheet of material 11 has an upper surface 12, a lower surface 14, and an outer periphery 15. As shown in FIGS. 1 and 2, the outer periphery 15 further comprises a first side 16, a second side 18, a third side 20 and a fourth side 22.

A bonding material 24 may be disposed on the upper surface 12 of the first sheet of material 11. Alternatively, however, the first sheet of material 11 may be free of a bonding material. As shown in FIG. 1, the bonding material 24, if present, is disposed in a preferred embodiment substantially over the upper surface 12 of the first sheet of material 11. The bonding material 24 may also be disposed upon the upper surface 12 in a strip of bonding material 24, although the bonding material 24 also could be applied to the upper surface 12 of the first sheet of material 11 in the form of spaced apart spots or the bonding material 24 also could be disposed on the upper surface 12 of the first sheet of material 11 in any other geometric or non-geometric or asymmetric forms, and in any pattern, including fanciful patterns.

The first sheet of material 11 has a thickness in a range from about 0.1 mils to about 10 mils. Preferably, the first sheet of material has a thickness in a range from about 0.4 mils to about 0.9 mils. The first sheet of material 11 is constructed of a material which is flexible.

The first sheet of material 11 may be any shape and a rectangular shape is shown in FIG. 1 only by way of example. The first sheet of material 11 for example only may be square, rectangular, circular or any other geometric, non-geometric, asymmetric or fanciful shape, such as heart shaped, for example only.

The first sheet of material 11 may be constructed of a single layer of material or a plurality of layers of the same or different types of materials. The layers of material comprising the first sheet of material 11 may be laminated together or connected together by any method known in the art.

In a preferred embodiment, the first sheet of material 11 is a light transmitting material constructed from a plastic film (Vifan BT medium slip biaxially oriented polypropylene film (clear)), having a thickness in a range from between about 0.4 mil and about 0.9 mil, available from Vifan Canada, Inc., Vifan street, Lanoraie d'Autray, Quebec, Canada J0K 1E0. An alternative plastic film (Hercules B523 oriented polypropylene packaging film (clear)), having a thickness in a range of between about 0.4 mil and about 0.9 mil, is available from Hercules Incorporated, Hercules Plaza, Wilmington, Del. 19894. The layers of material comprising the first sheet of material 11 are laminated together or may be connected together by and method known in the art.

The first sheet of material 11 is constructed from any suitable wrapping material that is capable of transmitting light into the iridescent material and permitting the iridescent effect of the iridescent material to be substantially maintained when the iridescent material is viewed through the light transmitting material. Further, the first sheet of material 11 must be capable of being wrapped about a flower pot or floral grouping, or used as a shredded decorative material, such as, but not by way of limitation, confetti, decorative grass, tinsel, glitter, sequins, flakes, and the like. Further, the first sheet of material must also be suitable for making small die-cut items, such as decals, labels, stickers, stars, and the like. Preferably, the first sheet of material 11 comprises paper (the term "paper" as used herein means treated or untreated paper, corrugated paper or cardboard or any other form of paper material), cellophane, foil, plastic film, metallized film, fabric (woven or nonwoven or synthetic or natural), burlap, or combinations thereof.

The term "plastic film" as used herein means a thermoplastic resinous material, such as, but not by way of limitation, a manmade polymer such as, but not by way of limitation, a polypropylene. The term "plastic film" as used herein also means a naturally occurring polymer such as cellophane. A plastic film, as contemplated and described in detail herein, is relatively strong and not as subject to tearing (substantially non-tearable), as might be the case with paper or foil.

Figure 3:
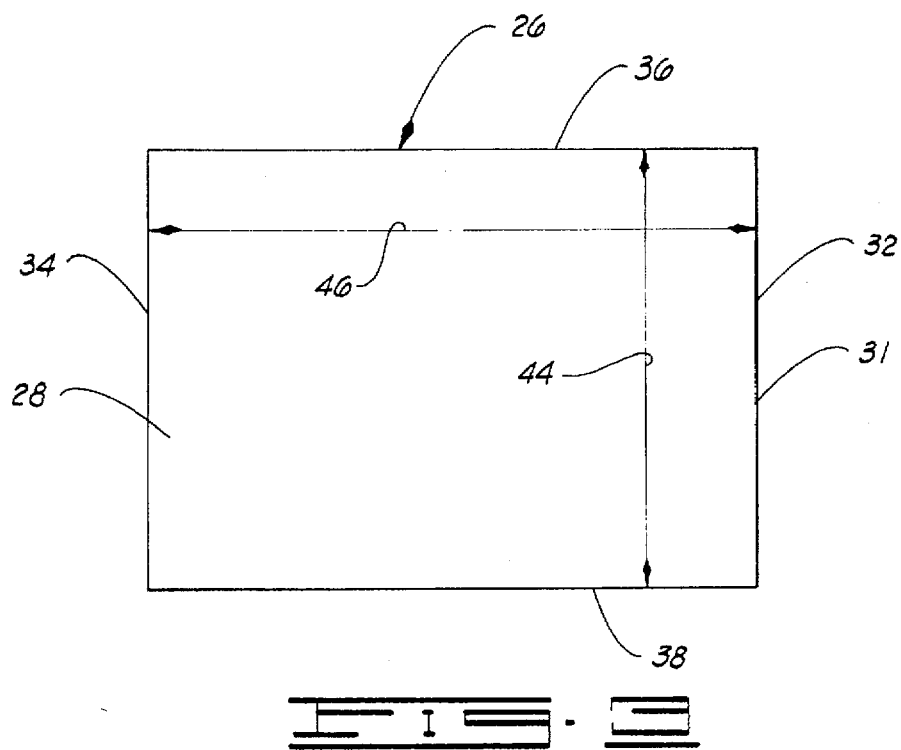
FIG. 3 is top plan view of the upper surface of the second sheet of material constructed in accordance with the present invention.

Shown in FIG. 3 is a second sheet of material 26. The second sheet of material 26 has an upper surface 28, a lower surface 30 and an outer periphery 31. As shown in FIG. 3, the outer periphery 31 further comprises a first side 32, a second side 34, a third side 36, and a fourth side 38. The second sheet of material 26 is an iridescent film. A preferred iridescent film is IF-8531 R/S, manufactured by Mearl Corporation, 1050 Lower South Street, Peekskill, N.Y., 10566. The second sheet of material 26 (IF-8531 R/S) has a thickness in a range of between about 0.4 mil and about 0.9 mil.

The second sheet of material 26 has a thickness in a range from about 0.1 mils to about 10 mils. The second sheet of material 26 has a thickness preferably in a range of between about 0.4 mil and about 0.9 mil. The second sheet of material 26 is also flexible, and is characterized by substantial iridescence.

Iridescent articles and the methods of making such articles are disclosed in U.S. Pat. No. 3,231,645, entitled "Method of Making Iridescent Plastic Sheets," issued to Bolomey on Jan. 25, 1966; U.S. Pat. No. 3,481,663, entitled, "Iridescent Articles and Methods of Manufacture", issued to Greenstein on Dec. 12, 1969; U.S. Pat. No. 4,162,343, entitled "Multilayer Light-Reflecting Film", issued to Wilcox et al. on Jul. 24, 1979; U.S. Pat. No. RE31,780, entitled "Multilayer Light-Reflecting Film", issued to Cooper et al. on Dec. 25, 1984; U.S. Pat. No. 5,008,143, entitled, "Decorative objects With Multi-Color Effects", issued to Armanini on Apr. 16, 1991; U.S. Pat. No. 5,089,318, entitled, "Iridescent Film With Thermoplastic Elastomeric Components", issued to Shetty et al. on Feb. 18, 1992, and U.S. Pat. No. 5,154,765, entitled, "Decorative Objects With Multicolor Effects", issued to Armanini on Oct. 13, 1992, all of which are hereby incorporated by reference herein.

The first sheet of material 11 has a length 40 extending between the third and fourth sides 20 and 22 of the first sheet of material 11. The first sheet of material 11 also has a width 42 extending between the first and the second sides 16 and 18 of the first sheet of material 11.

The second sheet of material 26 has a length 44 extending between the third and the fourth sides 36 and 38 of the second sheet of material 26. The second sheet of material 26 has a width 46 extending between the first and the second sides 32 and 34 of the second sheet of material 26.

The second sheet of material 26 may be any shape and a rectangular shape as shown in FIGS. 1 and 3 is illustrated only by way of example. The second sheet of material 26 for example only may be square, rectangular, circular or any other geometric, non-geometric, asymmetric or fanciful shape.

The second sheet of material 26 may be constructed of a single layer of materials or a plurality of layers of the same or different types of materials, as long as the end result is a material having substantial iridescence which is evident on both the upper surface 28 and the lower surface 30 of the second sheet of material 26, and the thickness of the second sheet of material 26 falls within the preferable range of thickness described above. When the second sheet of material 26 comprises more than one layer, the layers of material comprising the second sheet of material 26 may be connected together in any manner known in the art.

In operation, the second sheet of material 26 is placed adjacent the first sheet of material 11 as shown in FIG. 3. In this position, the lower surface 30 of the second sheet of material 26 is disposed adjacent the upper surface 12 of the first sheet of material 11. A bonding material 24 is disposed on the lower surface 30 of the second sheet of material 26, or, alternatively, the bonding material 24 is disposed on the upper surface 12 of the first sheet of material 11. In a further alternative, the bonding material 24 may be disposed on both the lower surface 30 of the second sheet of material 26 and the upper surface 12 of the first sheet of material 11. The width 42 of the first sheet of material 11 is about equal to the width 46 of the second sheet of material 26 so that, when the first and the second sheets of material 11 and 26 are disposed adjacent each other, the outer periphery 15 of the first sheet of material 11 is aligned with the outer periphery 31 of the second sheet of material 26. That is, the first side 16, the second side 18, the third side 20 and the fourth side 22, respectively, of the first sheet of material 11 are generally in alignment with the respective first side 32, the second side 34, the third side 36 and the fourth side 38 of the second sheet of material 26. It should be noted, therefore, that the first and the second sheets of material 11 and 26 each have virtually identical lengths 40 and 44, respectively, and widths 42 and 46, respectively. When at least the first sheet of material 11 and the second sheet of material 26 are laminated together via any bonding material 24 described herein or known in the art, the optical effect material 10 (and the optical effect sheet of material 64, as illustrated in FIG. 1), is formed.

Figure 4:
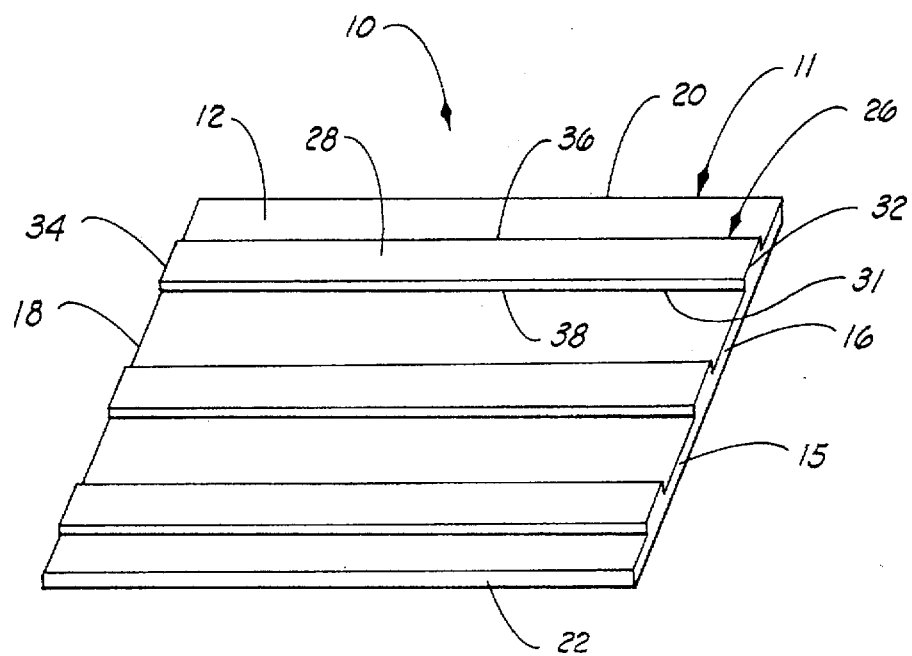
FIG. 4 is a perspective view of another embodiment of the present invention, but showing the second sheet of material as a plurality of strips of material which are spaced a distance apart and laminated to the upper surface of the first sheet of material.

In another alternative, shown in FIG. 4, the second sheet of material 26 comprises a plurality of second sheets of material which comprise strips of sheets of material (only one of the plurality of strips designated by the numeral 26). The plurality of second sheets of material 26 are laminated or bonded by any method known in the art to the first sheet of material 11.

Figure 5:
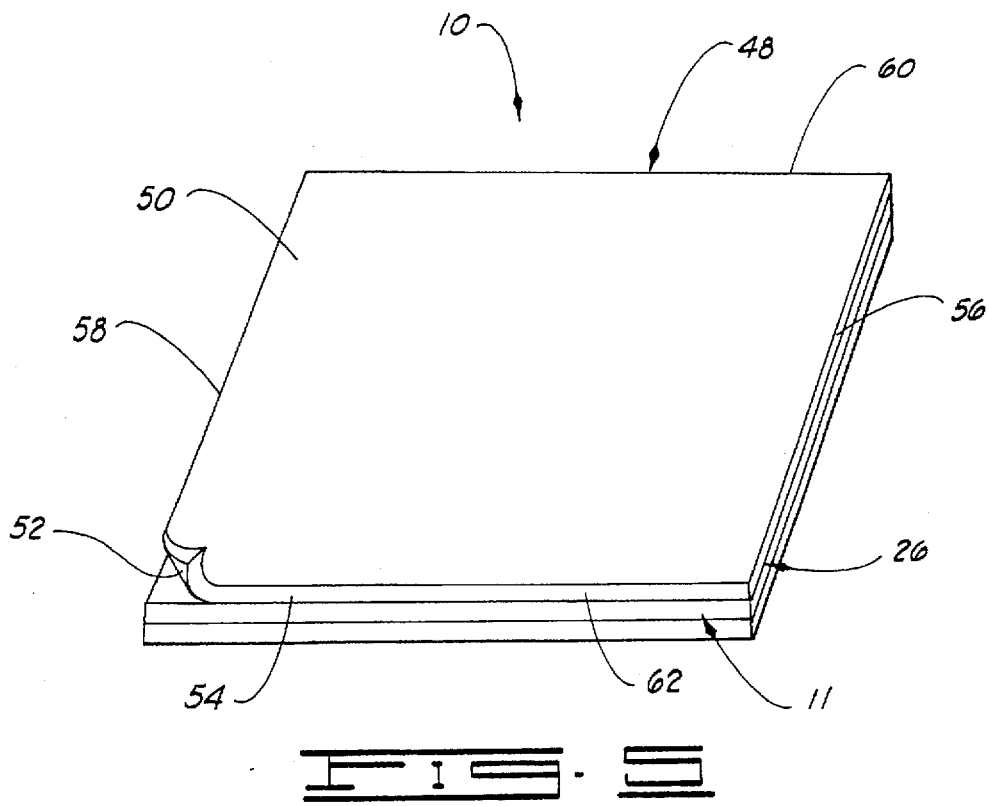
FIG. 5 is a perspective view of another embodiment of the present invention, but showing a third sheet of material disposed adjacent and connected to the upper surface of the second sheet of material, which is also disposed adjacent the first sheet of material.

It still a further embodiment, a third sheet of material 48 may be laminated to the opposite surface, that is, the upper surface 28 of the second sheet of material 26, in forming the optical effect material 10. In this instance, the third sheet of material 48, which is defined as having the identical characteristics and qualities as those characteristics and qualities described in detail herein for the first sheet of material 11 (the third sheet of material 48 may comprise different characteristics and qualities than the first sheet of material 11 utilized, but the third sheet of material 48 is not, like the second sheet of material 26, completely iridescent) is provided, and is laminated, for example but not by way of limitation, to the upper surface 28 of the second sheet of material 26, as shown in FIG. 5. The third sheet of material 48 has an upper surface 50, a lower surface 52, and an outer periphery 54. As illustrated in FIG. 5, the outer periphery 54 further comprises a first side 56, a second side 58, a third side 60 and a fourth side 62.

In a further alternative, the third sheet of material 48 may be laminated to the remaining non-laminated surface of the first sheet of material 11, that is, the lower surface 14 of the first sheet of material 11. It will therefore be appreciated that multiple sheets of material 11 may be used. Moreover, when multiple sheets of material 11 are used, the sheets of material 11 need not be uniform in size or shape. That is one sheet may extend beyond at least a portion of the outer periphery of another sheet of material. Finally, it will be appreciated that all sheets of material shown in all embodiments herein are substantially flat.

As noted earlier, a bonding material 24 may be disposed on the upper surface of the first sheet of material 11, or, alternatively, to any other surfaces of any sheets of material described herein. The bonding material 24 may be applied as a strip or as spots or other shapes. One method for disposing a bonding material, in this case an adhesive, on a sheet of material is described in U.S. Pat. No. 5,111,637 entitled "Method For Wrapping A Floral Grouping" issued to Weder et al., on May 12, 1992 and which is hereby incorporated herein by reference. Another method for disposing a bonding material in order to laminate two sheets of material is described in U.S. Pat. No. 4,297,811 entitled "Laminated Printed Foil Flower Pot Wrap With Multicolor Appearance", issued to Weder on Nov. 3, 1981.

The term "bonding material" when used herein means an adhesive, possibly a pressure sensitive adhesive, or a cohesive. Where the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" when used herein also means a lacquer, which may be applied to the sheet of material and, in this instance, heat, sound waves, or vibrations, also must be applied to effect the sealing of the lacquer.

When at least the first sheet of material 11 and the second sheet of material 26 are bonded together, the optical effect material 10 shown in FIG. 1 is formed. It will be appreciated that the optical effect material 10 may form a sheet of optical effect material 64, pads of optical effect material, and/or rolls of optical effect material, the latter two being described in detail below.

Further, the first, second, and/or third sheets of material 11, 26, and 48 may consist of designs or decorative patterns which are printed, etched, and/or embossed thereon using inks or other printing materials. An example of an ink which may be applied to the surface of the first, second and/or third sheets of material 11, 26 and 48 is described in U.S. Pat. No. 5,147,706 entitled "Water Based Ink On Foil And/Or synthetic organic polymer" issued to Kingman on Sep. 15, 1992 and which is hereby incorporated herein by reference. In addition, the first, second and/or third sheets of material 11, 26 and 48 may have various colorings, coatings, embossings, flocking and/or metallic finishes, or other decorative surface ornamentation applied separately or simultaneously or may be characterized totally or partially by pearlescent, translucent, transparent, iridescent or the like, qualities. Each of the above-named characteristics may occur alone or in combination and may be applied to the upper and/or lower surface of the first, second and/or third sheets of material 11, 26 and 48. Moreover, each surface of the first, second, and/or third sheets of material 11, 26 and 48 may vary in the combination of such characteristics. The first and/or third sheets of material 11 and 48 may be opaque, translucent, clear or tinted transparent.

The bonding material 24 used to laminate the first sheet of material 11 and the second sheet of material 26 together may also be tinted of color by using a dye, pigment, or ink. In this manner, different coloring effect are provided, and the first sheet of material 11 and/or the second sheet of material 26 may be given a colored appearance by use of a colored bonding material 24. U.S. Pat. No. 5,147,706 described immediately above provides one water based ink which may be used to tint either sheet of material 11 or 26 or which may be used to tint the bonding material 24.

The use of a light transmitting material, such as a plastic film, for example, as the first sheet of material 11 permits the iridescence of the second sheet of material 26 to substantially be maintained through the first sheet of material 11. But, when the second sheet of material 26 is laminated to a first sheet of material 11 comprising either a foil or a metallized film (tinted or non-tinted), then the iridescent quality is obtained when the laminated film is shredded into small pieces, flakes, or the like. Therefore, when the second sheet of material 26 is utilized with a first sheet of material 11 comprising a foil or metallized film, additional adhesive, an additional sheet of clear or tinted material, or additional reflective material (such as, but only by way of example, oxide flakes) must be provided which between the second sheet of material 26 and the first sheet of material 11 to permit optimal light to be reflect back through the iridescent film from the metallized film, to substantially maintain, for small pieces of decorative material, the iridescent quality of the second sheet of material 26. It is notable that when large first and second sheets of material 11 and 26 are laminated together and not shredded, the iridescence appears substantially intact without an additional sheet of material, adhesive, or oxide flakes.

Figure 6:
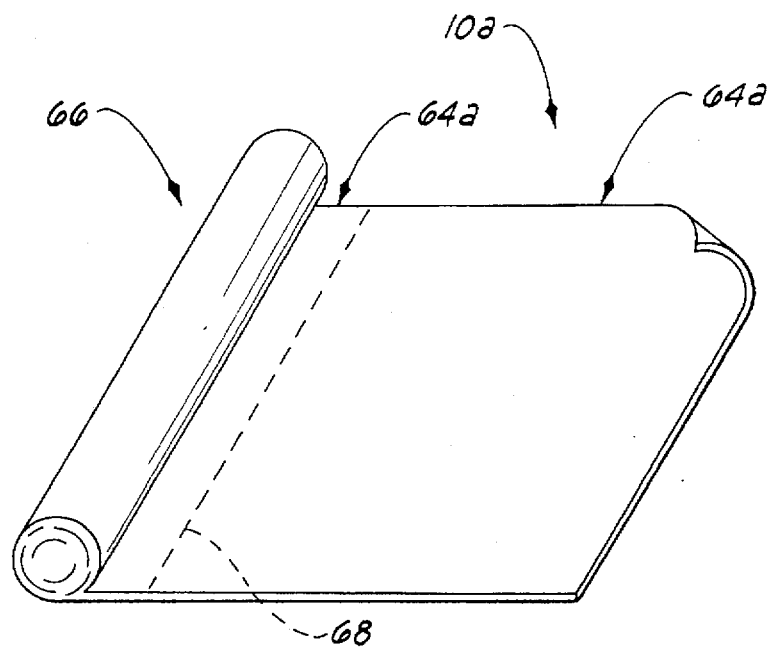
FIG. 6 is a perspective view of a plurality of sheets of optical effect material constructed in accordance with the present invention forming a continuous roll of sheets, the sheets separated by perforations, and the roll partially unrolled to reveal a single sheet still attached thereto.

Embodiments of FIGS. 6–8

Referring now to FIG. 6, a plurality of individual sheets of optical effect material 64a are connected linearly together to form a roll 66. Preferably, the plurality of sheets of optical effect material 64a in the roll 66 are connected by perforations 68, as illustrated in FIG. 6. Such a roll 66 permits one sheet of optical effect material 64a to be withdrawn from the roll 66, then severed or disconnected from the roll 66. Alternatively, the roll 66 may simply be formed as a continuous roll 66 of optical effect wrapping material without perforations (not shown), wherein a plurality of sheets of optical effect material 64a may be removed from the roll 66 by unrolling a portion of the roll 66, and using a separate cutting element (not shown) to sever the unrolled portion of the roll 66 of material to form the sheet of optical effect material 64a. The roll 66 may also be contained within a dispenser 70, as illustrated in FIG. 7. When the roll 66 is disposed in the dispenser 70, a portion of the optical effect material is again unrolled, and a serrated cutting edge 72 contained within the dispenser 70, or a separate cutting element (not shown), severs the unrolled portion of the optical effect material from the roll 66 to form a sheet of optical effect material 64a. Any number of sheets of optical effect material 64a may form a roll 66 as long as it is possible to withdraw at least one sheet 64a from the roll 66 as described herein. A roll 66 formed by one sheet of optical effect material is shown in FIG. 8.

Figure 9:
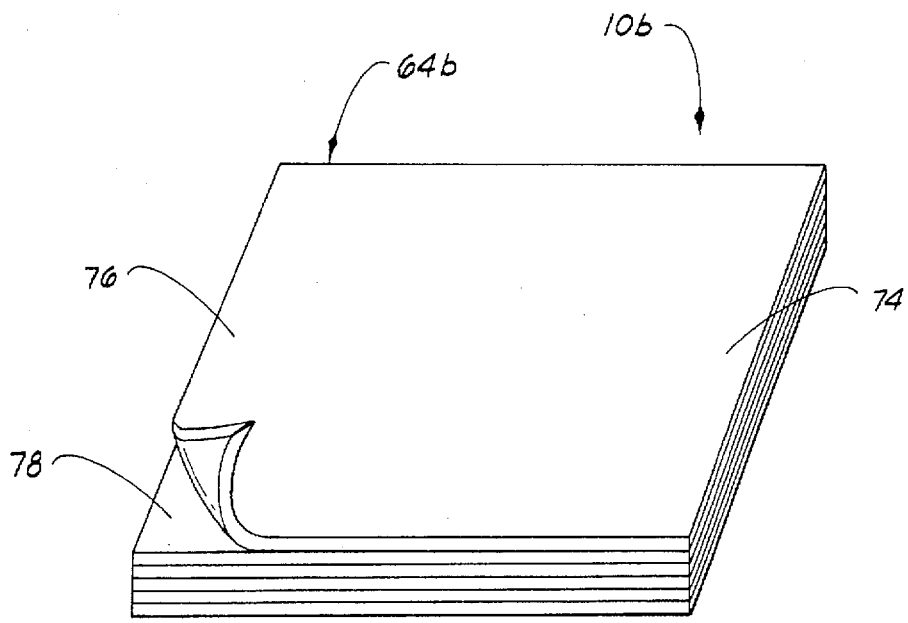
FIG. 9 is a perspective view of a pad of sheets of optical effect material constructed in accordance with the present invention, showing an edge of the top sheet lifted, exposing the second sheet (each sheet of optical effect material, shown as only one sheet, comprising a first sheet of material and a second sheet of material).
Figure 10:
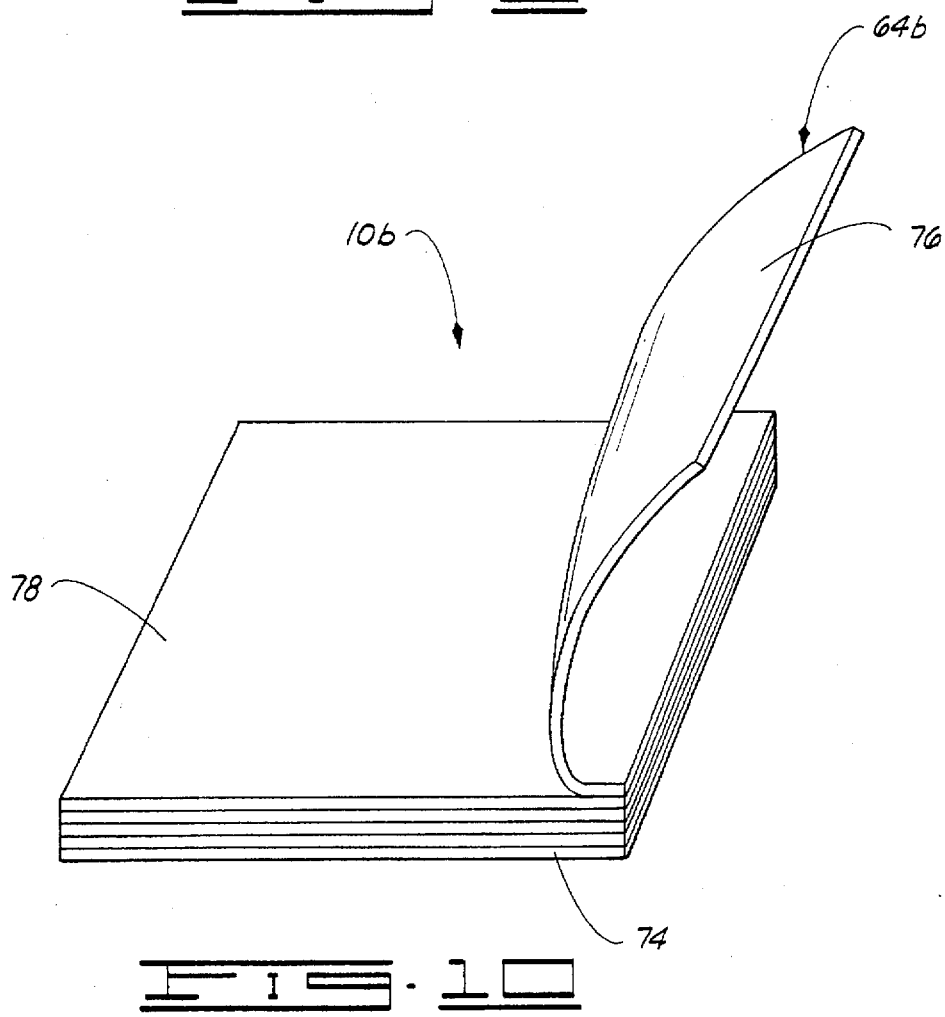
FIG. 10 is a perspective view of the pad of sheets of optical effect material shown in FIG. 9, but showing the top sheet of material being detached from the pad of sheets of optical effect material.

Embodiments of FIGS. 9–10

Shown in FIG. 9 is a modified optical effect material 10b which is identical to the optical effect material 10 shown in FIGS. 1–5 and described in detail previously, except that the optical effect material 10b is formed into sheets of optical effect material 64b which are stacked and aligned one on top of the other to form a pad 74 of sheets of optical effect material 64b.

The pad 74 includes a top sheet 76 having a next sheet 78 disposed directly thereunder, with additional sheets of optical effect material 64b disposed under the next sheet 78, all sheets collectively forming the pad 74 of sheets of optical effect material 64b (one edge of the top sheet 76 lifted for illustration purposes only). The sheets of optical effect material 64b are generally aligned, and are connected together via a bonding material (not shown), such as, but not by way of limitation, a pressure sensitive adhesive.

When the top sheet 76 of optical effect material 64b is lifted and removed from the pad 74, as shown in FIG. 10, the next sheet 78 becomes the new top sheet 76, and the sheet directly below the new top sheet 76 becomes the new next 78. This process is repeated, until all of the sheets of optical material 64b in the pad 74 are removed.

In operation, a floral grouping or flower pot may be placed on the top sheet 76 in the pad 74 and the top sheet 76 may be wrapped about the floral grouping or flower pot and removed from the pad 74. Methods of forming a pad, using the sheets of material to wrap floral groupings, and removing sheets from a pad are described in U.S. Pat. No. 5,181,363 entitled "Wrapping A Floral Grouping With Sheets Having Adhesive Or Cohesive Material Applied Thereto" issued to Weder on Jan. 26, 1993, which is hereby incorporated by reference herein.

Figure 11:
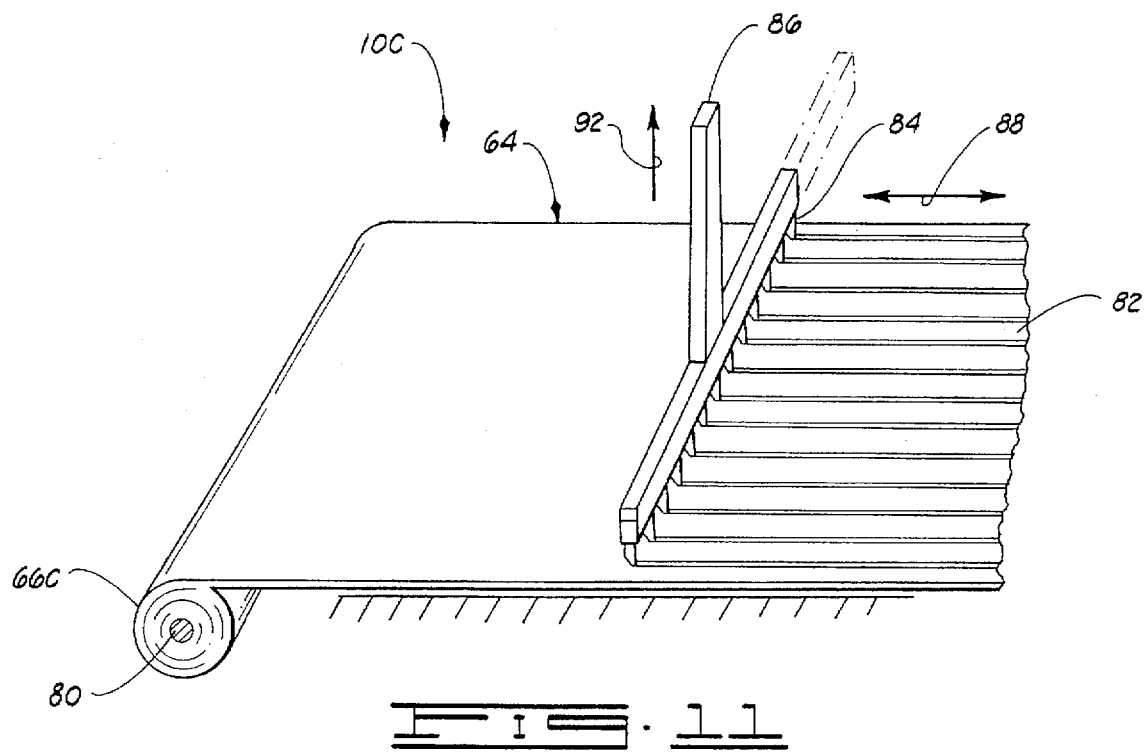
FIG. 11 is a perspective view of a roll of optical effect material constructed in accordance with the present invention (the first sheet and the second sheet shown as combined into a single sheet), showing a knife edge being actuated by an actuator to cut at least a portion of the roll of optical effect material into elongated strips of optical effect material.
Figure 12:
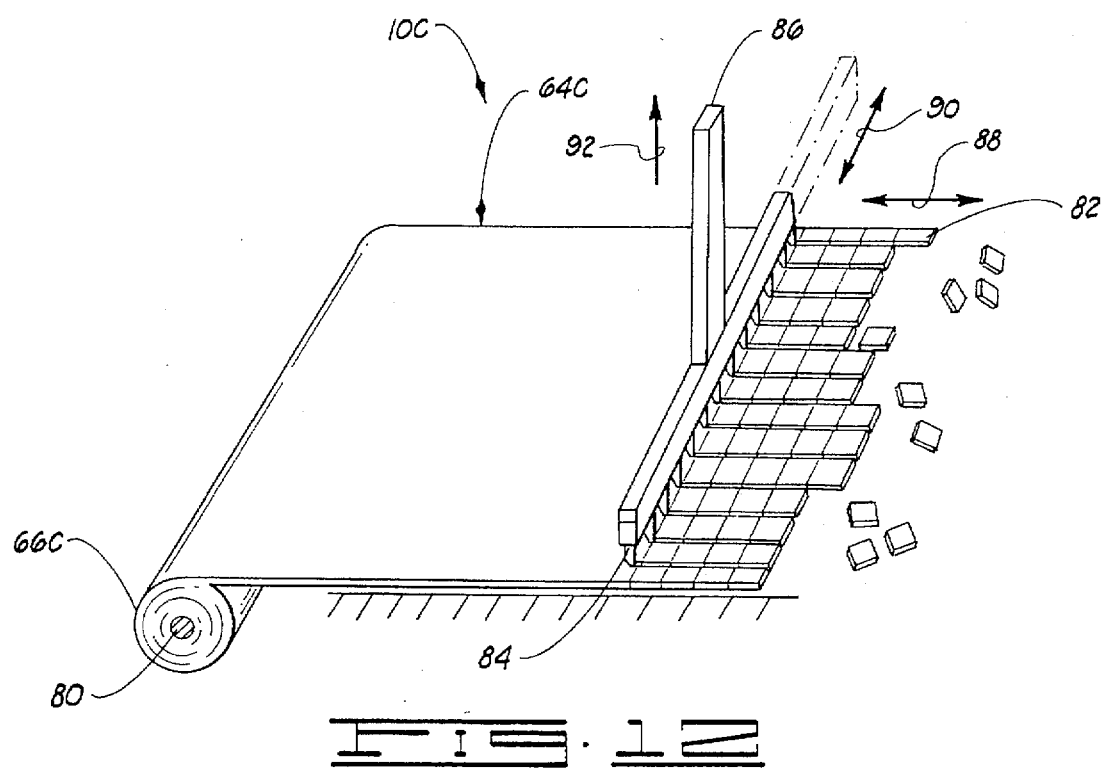
FIG. 12 is a perspective view of the roll of optical effect material of FIG. 11, but showing the knife edge being actuated in a second direction, to cut the elongated strips of optical effect material into small pieces of optical effect material.

Embodiments of FIGS. 11–12

Shown in FIG. 11 is a modified roll 66c of optical effect material 10c which comprises at least a first sheet of material 11c and a second sheet of material 26c laminated or otherwise connected together as previously described in detail and illustrated herein (the optical effect material 10c being shown as a single layer). The roll 66c of optical effect material 10c is constructed exactly like the roll 66 of optical effect material 10a described before, except the roll 66c of optical effect material 10c is not disposed in a dispenser constructed like the dispenser 70 shown in FIG. 7. Rather, the roll 66c of optical effect material 10c is supported on a generally mounted shaft 80. Optical effect material 10c is withdrawn from the roll 66c of optical effect material 10c via a leading edge 82 until a predetermined length of the optical effect material 10c has been withdrawn from the roll 66c of optical effect material 10c thereby forming a sheet of optical effect material 64c. In this position, a portion of the optical effect material 10c is disposed under a knife edge 84 having a plurality of edges. The knife edge 84 is connected to an actuator 86 adapted to move the knife edge 84 in a first shredding direction 88 and in a second direction 90. When the predetermined length of the optical effect material 10c has been withdrawn from the roll 66c of optical effect material 10c, the actuator 86 actuates to move the knife edge 84 in the first direction 88 to a position wherein the knife edge 84 severingly engages the optical effect material 10c to shreddingly cut a plurality of elongated portions of the optical effect material 10c from the sheet of optical effect material 64c. In another optional mode, the actuator 86 may then turn the knife edge 84 to a second direction 90 wherein the knife edge severingly re-engages the plurality of elongated portions of the optical effect material 10c, thereby causing the elongated portions of the optical effect material 10c to be severed into small pieces, for use as glitter, confetti, tinsel, and the like, for example (it will be appreciated that this process is represented schematically in the drawings). The actuator 86 may comprise a hydraulic or pneumatic cylinder or a motor and gear arrangement or any other form of arrangement suitable for moving the knife edge 84 in the directions 88 and 90. After the knife edge 84 has cuttingly severed the desired portions of the sheet of optical effect material 64c from the roll 66c of optical effect material 10c, the actuator 86 is actuated to move the knife edge 84 in the storage direction 92 to a storage position disposed a distance above the optical effect material 10c as opposed to the cutting position previously described. Alternatively, the leading edge 82 may be run across a first knife edge 84 (not shown) set in the surface to form the elongated strips of optical effect material 10c, wherein the actuator 86 actuates a second knife edge (not shown) to cross-cut the elongated strips of optical effect material 64c into small pieces. Apparatus and methods for making decorative shredded materials and the like is disclosed in U.S. Pat. No. 4,646,388, entitled, "Apparatus For Producing Weighed Charges Of Loosely Aggregated Filamentary Material", issued to Weder et al. on Mar. 3, 1987, which is hereby incorporated by reference herein.

When dealing with shredded material, especially shredded iridescent material and non-iridescent material, the process of combining the two in approximately and equal quantities is time consuming and costly. It is difficult, after a material is shredded, to mix the two dissimilar materials together. The embodiment shown previously in FIG. 4 and described in detail herein would eliminate the need for costly and time-consuming "mixing" of the two types of shredded material. This process is also advantageous for mixing even smaller pieces of material, such as sequins, labels, decals, glitter, tinsel, and the like.

Embodiments of FIGS. 13–16

As noted previously, a sheet of optical effect material may be used to wrap a floral grouping indentified herein by the reference numeral 94. "Floral grouping" as used herein means cut fresh flowers, artificial flowers, a single flower other fresh and/or artificial plants or other floral materials and may include other secondary plants and/or ornamentation or artificial or natural materials which add to the aesthetics of the overall floral arrangement. The floral grouping 94 comprises a bloom (or foliage) portion 96 and a stem portion 98. However, it will be appreciated that the floral grouping 94 may consist of only a single bloom or only foliage (not shown). The term "floral grouping" may be used interchangeably herein with the term "floral arrangement".

In a method of use, a modified sheet of optical effect material 64d is provided, which is identical to the sheet of optical effect material 64 shown in FIG. 1 and described in detail previously, except that the sheet of optical effect material 64d has a strip of bonding material 24d disposed on an upper surface 28d and near first sides 12d and 32d of the sheet of optical effect material 64d, the strip extending between third sides 20 and 36, respectively and fourth sides 22 and 38, respectively, of the sheet of optical effect material 64d.

Figure 13:
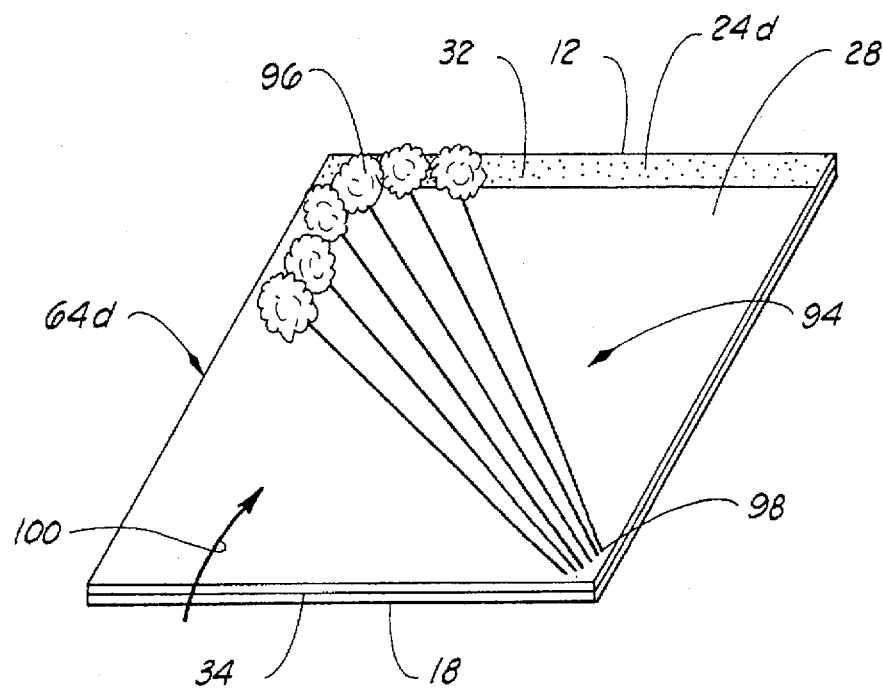
FIG. 13 is a perspective view of a floral grouping disposed on a sheet of optical effect material.
Figure 14:
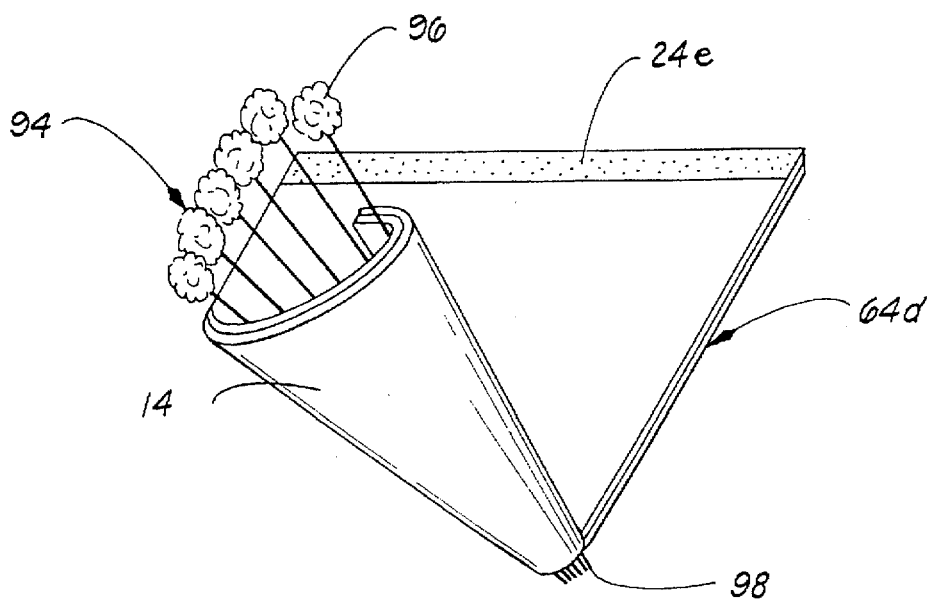
FIG. 14 is a perspective view of the floral grouping of FIG. 13 being wrapped in one method of wrapping.

The floral grouping 94 having a stem portion 98 and a bloom portion 96 (FIG. 13) is disposed on the upper surface 28d of the sheet of optical effect material 64d. The sheet of optical effect material 64d then is wrapped about the floral grouping 94 by taking the second sides 34 and 18, respectively, of the sheet of optical effect material 64d and rolling the sheet of optical effect material 64d in a direction 100 about the floral grouping 94 (FIG. 14). The sheet of optical effect material 64d is continued to be rolled about the floral grouping 94 until a portion of the bonding material 24d is disposed adjacent a portion of a lower surface 14d of the sheet of optical effect material 64d and brought into bonding contact or engagement therewith (FIG. 15) thereby bondingly connecting the bonding material 24d on the upper surface 28d of the sheet of optical effect material 64d to a portion of the lower surface 14d of the sheet of optical effect material 64d for cooperating to secure the sheet of optical effect material 64d in a wrapped condition about the floral grouping 94 to provide a wrapper 102 wrapped about the floral grouping 94, as shown in FIG. 15.

Figure 15:
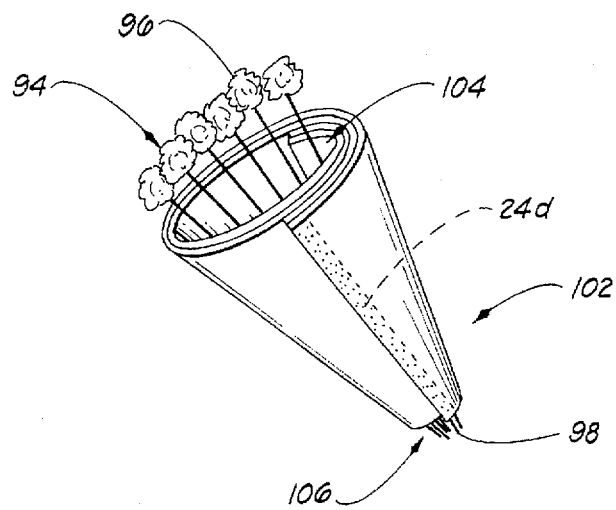
FIG. 15 is a perspective view of the floral grouping wrapped in a conical fashion.

In the wrapped condition with the sheet of optical effect material 64d wrapped about the floral grouping 94 as shown in FIG. 15, the wrapper 102 forms a conical shape with an opened upper end 104 and an opened lower end 106. The wrapper 102 covers a portion of the bloom portion 96 of the floral grouping 94. A portion of the stem portion 98 of the floral grouping 94 extends through the opened lower end 106 of the wrapper 102. The wrapper 102 is tightly wrapped about the stem portion 98 of the floral grouping 94. The bonding material 24d on the sheet of optical effect material 64d may contact and engage some of the stem portion 98 of the floral grouping 94 to cooperate in securing the wrapper 102 tightly wrapped about the stem portion 98 and to prevent the floral grouping 94 from slipping or moving within the wrapper 102.

At least a portion of the floral grouping 94 is disposed within the wrapper 102. In some applications, the stem portion 98 of the floral grouping 94 extends through the open lower end 106 of the wrapper 102, as described before. In other applications, the stem portion 98 does not extend through the open lower end 106 of the wrapper 102. In some applications, the wrapper 102 is tightly wrapped about the stem portion 98 of the floral grouping 94. The bloom portion 96 of the floral grouping 94 is disposed near the open upper end 104 of the floral grouping 94 and the bloom portion 96 of the floral grouping 94 is visible via the open upper end 104 of the wrapper 102. In some instances, the bloom portion 96 of the floral grouping 94 may extend beyond the open upper end 104 of the wrapper 102. In some applications, the upper end 104 of the wrapper 102 may be closed if desired. In some applications, the lower end 106 of the wrapper 102 may be closed if desired.

Figure 16:
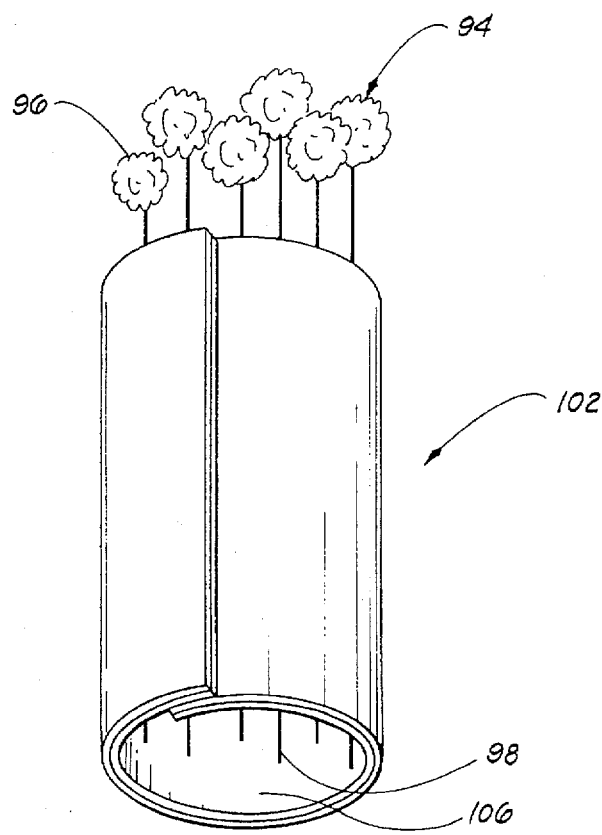
FIG. 16 is a perspective view of another method of using a sheet of optical effect material to wrap a floral grouping in a cylindrical fashion.

The wrapper 102, as shown in FIG. 15, is generally conically shaped. The sheet of optical effect material 64d may also be wrapped about the floral grouping 94 to form a cylindrically shaped wrapper 108 as shown in FIG. 16 or any other shape wrapper if desired in a particular application.

U.S. Pat. No. 5,181,364, entitled "Wrapping A Floral Grouping With Sheets Having An Adhesive Or Cohesive Material Applied Thereto", issued to Weder et al. on Jan. 26, 1993, which has been incorporated by reference herein above, discloses methods of wrapping a floral grouping in a cylindrically-shaped wrapper.

Embodiments of FIGS. 17–21

As noted above, a sheet of optical effect material 64 may be used to provide a decorative cover 109 for an object such as a flower pot 110 or a potted plant. The term "flower pot" refers to any type of container used for holding a floral grouping or a potted plant. Examples of flower pots used in accordance with the present invention are clay pots, plastic pots, wooden pots, pots made from natural and/or synthetic fiber, and the like.

The flower pot 110 has an open upper end 112, a closed lower end 114, and an outer peripheral surface 116. An opening 118 intersects the open upper end forming an inner peripheral surface 120 and a retaining space 122.

A modified sheet of optical effect material 64e, identical to the sheet of optical effect material 64 shown in FIG. 1 is provided, except that the sheet of optical effect material 64e has either a bonding material 24e disposed substantially thereon, or is formed at least partially from a shape-sustaining material, or both. To cover the object, the sheet of optical effect material 64e may be manually or automatically formed about the outer peripheral surface 116 of the pot 110 or potted plant. Or, the sheet of optical effect material 64e may be formed into a preformed decorative cover which is then placed about the outer peripheral surface 116 of the pot 110 or potted plant.

Figure 17:
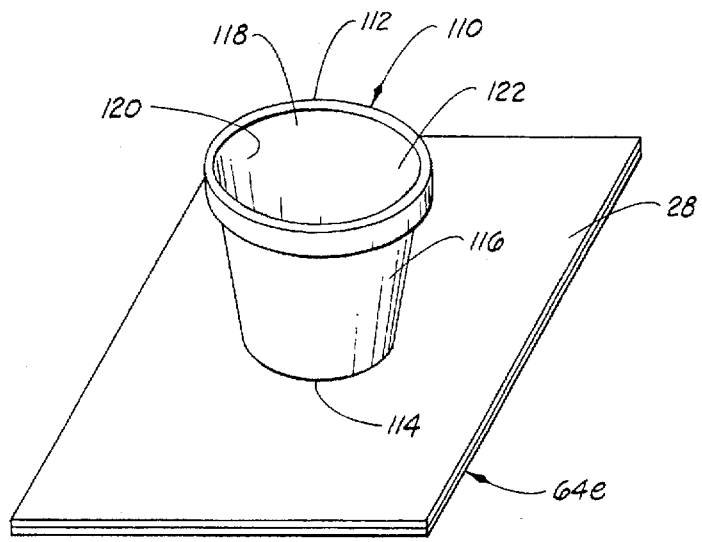
FIG. 17 is a perspective view of another embodiment of the sheet of optical effect material of the present invention, and a pot disposed upon the sheet.
Figure 18:
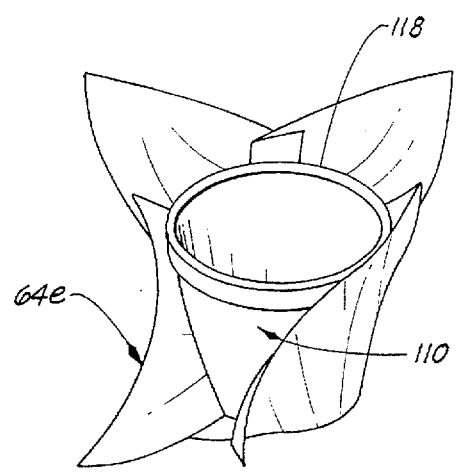
FIG. 18 is a perspective view of the sheet of optical effect material of FIG. 17, but showing the sheet of material partially wrapped about the flower pot.

In a method of use, referring to FIG. 17, to form a sheet of optical effect material 64e into a decorative cover 109 about a pot 110, both a flower pot 110 and a sheet of optical effect material 64e is provided. The pot 110 is disposed upon the upper surface 28e of the sheet of optical effect material 64e, so the lower end 114 of the pot 110 rests upon a portion of the upper surface 28e.

Figure 19:
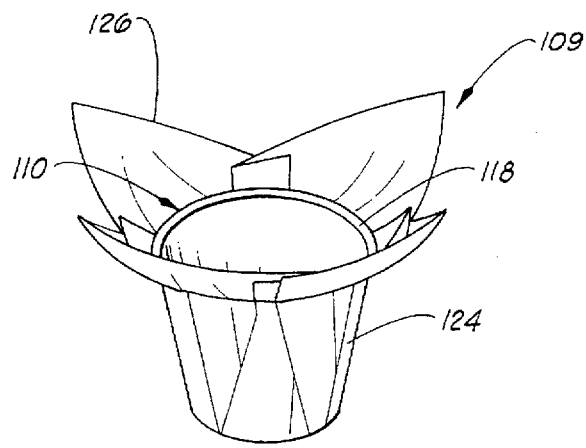
FIG. 19 is a perspective view of the sheet of optical effect material wrapped about a flower pot.

In one embodiment of a manual application of the sheet of optical effect material 64e about the pot 110, the upper surface 28e of the sheet of optical effect material 64e is formed about the outer peripheral surface 116 of the pot 110 (FIGS. 18 and 19), thereby engaging the outer peripheral surface 116 to form a decorative cover 109 about the pot 110 as shown in FIG. 19, in a manner which is known to those having ordinary skill in the art. The lower surface 14e of the sheet of optical effect material 64e thereby becomes the outer surface 124 of the decorative cover 109.

Another method for wrapping the sheet of optical effect material 64e about a pot 110 for forming such a decorative cover 109 is shown in U.S. Pat. No. 4,733,521 entitled "Cover Forming Apparatus" issued to Weder et al., on Mar. 29, 1988, which is hereby incorporated herein by reference. The decorative cover 109 formed by wrapping the sheet of optical effect material 64e about the flower pot 110 may be secured to the outer peripheral surface 116 of the pot 110 by the use of one or more bonding materials described herein. One particular method of securing the decorative cover 109 to the pot 110 is by applying a band (not shown) about the pot 110 to hold the decorative cover 109 in place such as is described in U.S. Pat. No. 5,105,599 entitled "Means For Securing A Decorative Cover About A Flower Pot" issued to Weder on Apr. 21, 1992 and which is hereby incorporated herein by reference.

The term "band" when used herein means any material which may be secured about an object such as a flower pot, such bands commonly being referred to as elastic bands, rubber bands or non-elastic bands and also includes any other type of material such as an elastic or non-elastic string or elastic piece of material, non-elastic piece of material, a round piece of material, a flat piece of material, a ribbon, a piece of paper strip, a piece of plastic strip, a piece of wire, a tie wrap or a twist tie or combinations thereof or any other device capable of gathering the sheet of material to removably or substantially permanently form a crimped portion and secure the crimped portion formed in the sheet of material which may be secured about an object such as the flower pot. The band also may include a bow if desired in a particular application.

Figure 20:
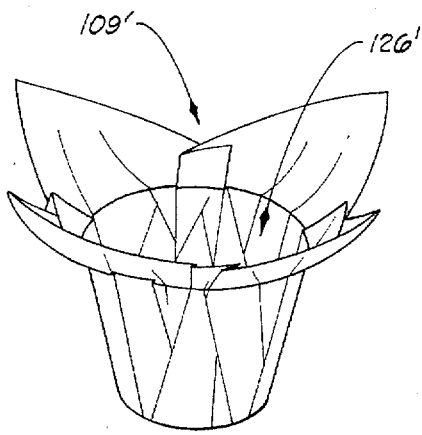
FIG. 20 is a perspective view of a pre-formed decorative pot cover formed from a sheet of optical effect material.
Figure 21:
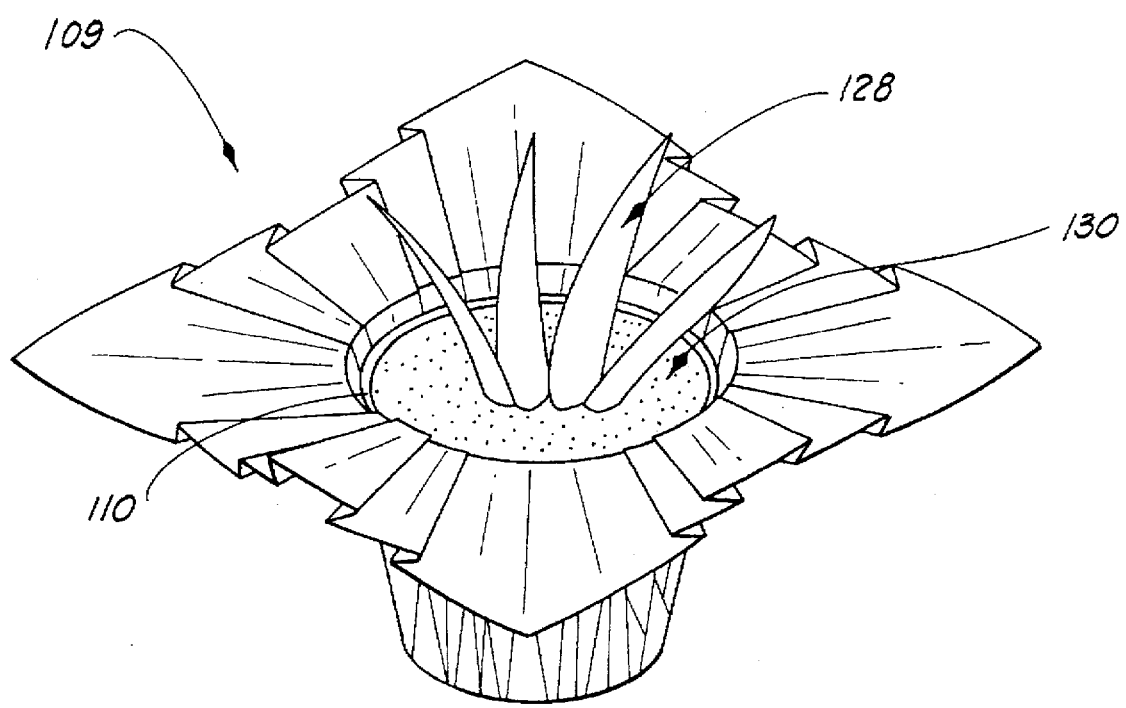
FIG. 21 is a perspective view of a potted plant and preformed decorative pot cover of FIG. 20, but showing a potted plant disposed into the pre-formed decorative pot cover.

Alternatively, the sheet of optical effect material 64e may be preformed into a decorative cover 109' having an opening 126' as shown in FIG. 20. The decorative cover 109' is self-supporting by virtue of overlapping folds which are bonded to each other, thereby forming a rigid structure. A potted plant 128 can be disposed into the opening 126' of a preformed cover 109', thereby resulting in a decoratively covered potted plant 128 as shown in FIG. 21.

One method for forming such a preformed plant cover or pot cover is shown in U.S. Pat. No. 4,773,182 entitled "Article Forming System" issued to Weder et al., on Sep. 27, 1988, which is hereby incorporated herein by reference.

The term "potted plant" as used herein means a plant having a bloom or foliage portion 96' and a stem portion 98' as well as a root portion (not shown), the root portion disposed in a growing medium 130. The term "potted plant" as used herein also includes botanical items and propagules.

The term "botanical item" when used herein means a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet or floral grouping.

The term "propagule" when used herein means any structure capable of being propagated or acting as an agent of reproduction including seeds, shoots, stems, runners, tubers, plants, leaves, roots or spores.

The term "growing medium" when used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

The Embodiments of FIGS. 22–28

Shown in FIG. 22 and designated therein by the general reference numeral 210 is a wrapper for a floral grouping constructed from the optical effect material 10f, as shown in FIG. 1 and described in detail herein previously. The wrapper 210 comprises a sleeve 212 which is generally tubular in shape. The sleeve 212 has a first end 214, a second end 216, an outer peripheral surface 218 and an opening 220 intersecting both the first end 214 and the second end 216, forming an inner peripheral surface 222 and providing a retaining space 223 therein. In some embodiments (not shown), the second end 216 is closed, forming a closed end (not shown), and the opening 220 only intersects the first end 214 of the sleeve 212. Sleeves, and their construction, are well known in the art and sleeves are commercially available, as are various devices and mechanisms capable of forming sleeves. It will be appreciated that either the first sheet of material 11f or the second sheet of material 26f may form either the inner peripheral surface 222 or the outer peripheral surface 218 of the sleeve 212, respectively.

The wrapper 210 further comprises both the sleeve 212 and a floral grouping 94f (FIG. 23). The sleeve is adapted to receive a floral grouping 94f within the retaining space 223.

The floral grouping 94f (FIG. 23) may be disposed in the opening 220 in the sleeve 212 and contained substantially in the receiving space 223 of the sleeve 212, as will be described in detail below.

A bonding material 24f may be disposed on at least a portion of the inner peripheral surface 222 of the sleeve 212 )not shown), or, alternatively, the bonding material 24f may be disposed on the outer peripheral surface 218 of the sleeve 212, as illustrated in FIG. 24, or, in a further alternative, the bonding material 24f may be disposed on both the inner peripheral surface 222 and the outer peripheral surface 218 of the sleeve 212 (not shown).

The bonding material 24f may further comprise a color, or a combination of colors, as previously described herein. Further, the bonding material 24f may comprise at least a portion of a design on the sleeve 212. "Designs," as used herein, are defined as any geometric form, or any combination of geometric forms, for example, squares, round spots, triangles, rectangles, octagonals, or the like (not shown). "Designs" are further defined as any non-geometric, asymmetrical or fanciful forms, or any combination thereof, for example, but not by way of limitation, hearts, balloons, flowers, lace, slogans, logos, print (any combination of letters and/or numbers), signs, human forms (real and fictional) animal forms (real and fictional), cartoon characters, and/or plant forms.

Such a design may comprise a color, or a portion of a color, or any combination of colors. Alternatively, at least a portion of the design may be colorless, translucent, transparent, opaque, pearlescent, iridescent, or the like.

The sleeve 212 is generally tubularly shaped, but the sleeve 212 may be, by way of example but not by way of limitation, cylindrical, conical, frusto-conical, or a combination of both frusto-conical and cylindrical (not shown). Further, as long as the sleeve is capable of receiving the floral grouping 24f, any shape of sleeve 12, whether geometric, non-geometric, asymmetrical and/or fanciful, may be utilized.

In a general method of use, illustrated in FIGS. 23–25, at least a portion of the floral grouping 94f is disposed within the sleeve 212. In some applications, the stem portion 98f of the floral grouping 94f extends into the sleeve 212 via the open first end 214, extending through the open second end 216 of the sleeve 212 and beyond the open second end 216. The bloom portion 96f of the floral grouping 24f is therefore disposed near the open first end 214 of the sleeve 212 and the bloom portion 96f of the floral grouping 94f is visible via the open first end 214 of the sleeve. (FIGS. 23–25). In some instances, the bloom portion 96f of the floral grouping 94f may extend above the open first end 214 of the sleeve 212. In some applications, the first end 214 of the sleeve 212 may be closed if desired (not shown). In some circumstances, the second end 216 of the sleeve 212 may be closed if desired (not shown).

In one method of use (FIGS. 23–25), an operator provides a sleeve 212 (FIG. 22), and a floral grouping 94f (FIG. 24). The operator then disposes the floral grouping 94f into the sleeve 212 by opening the sleeve 212 at the first end 214 and assuring both that the opening 220 therein is in an open condition, and that the inner peripheral surface 222 of the sleeve 212 is somewhat expanded outward as well, the retaining space 223 sized to receive the floral grouping 94f, as shown in FIG. 22. The operator then disposes the floral grouping 94f into the opening 220 in the sleeve 212 and the retaining space 223 by inserting first the stem portion 98f of the floral grouping 94f into the retaining space 223 of the sleeve 212 via the opening in the first end 214, in a manner which permits a portion of the stem portion 98f to be disposed in the retaining space 223 adjacent the second end 216 of the sleeve 212, the second end 216 generally having the narrowest diameter. In inserting the floral grouping 94f into the sleeve 212 in this manner, the bloom portion 96f is also disposed in the retaining space 223 of the sleeve 212 and the bloom portion 96f is disposed adjacent the first end 214 of the sleeve 212, the first end 214 having generally the widest diameter. In this method, at least a portion of the stem portion 98f of the floral grouping 94f extends slightly beyond the second end 216 of the sleeve 212, and the bloom portion 98f of the floral grouping 94f is clearly visible at the open first end 214 of the sleeve 212.

The sleeve 212 may then be crimped about the floral grouping 94f, as shown in FIGS. 24–25. The crimping operation is conducted by an operator after the floral grouping 94f is disposed in the sleeve 212 by crimping at least a portion of the sleeve 212 in the area of the stem portion 98f of the floral grouping 94f, at least a portion of the bonding material 24f being disposed on this area to retain the crimped sleeve 212 in the crimped condition. Such crimping may be conducted by hand, by grasping and substantially encompassing with one or more hands the second end 216 of the sleeve 212 in the area of the bonding material 24f and evenly and firmly squeezing that portion of the sleeve 212 about the area having the bonding material 24f, thereby pressing and gathering both the sleeve 212 and the bonding material 24f against itself and about the stem portion 98f of the floral grouping 94f. The sleeve 212 may also be crimped by using both a crimping motion (as described above) and a turning motion to create a twisted crimping, resulting in a sleeve 212 which is both crimped as previously described, and which is twisted about at least a portion of the stem portion 98f of the floral grouping 94f, the sleeve 212 near the stem portion 98f being rotated for example but not by way of limitation, about the stem portion 98f between about one-eighth of a turn to about a full turn (not shown).

When the sleeve is crimped, a plurality of overlapping folds 240 are formed in the crimped area. The plurality of overlapping folds 240 (only one overlapping fold designated by the numeral 240) resulting from the gathered, crimped material of the sleeve 212 may be connected, that is, all portions of the overlapping optical effect material 10f of the sleeve 12 are bondingly connected together via bonding material 24f. A plurality of overlapping folds 240 may be formed by hand, during crimping, or by mechanical means. Such mechanical means are disclosed generally in "Article Forming System," which has been previously incorporated by reference herein. Alternatively, the crimping may be conducted in a manner in which not all of the plurality of overlapping folds 240 are bondingly connected together. It will be appreciated that the plurality of overlapping folds 240 (connected or unconnected) are formed primarily in the crimped area. Such crimping as described above may also be conducted by any device or mechanism known in the art and used for gathering or crimping materials.

Alternatively, the sleeve may remain uncrimped. The bonding material 24f disposed upon the sleeve 212 may cause the sleeve 212 to bondingly connect to portions of itself, causing the sleeve 212 to conform, either generally, or closely (depending, as will be appreciated, upon the amount of bonding material 24f and the amount of the optical effect material 10f of the sleeve 212 which overlaps and connects to itself) to the floral grouping 94f.

When the floral grouping 94f is disposed in the sleeve 212 by any method described herein, or known in the art, the sleeve 212 substantially surrounds and encompasses a substantial portion of the floral grouping 94f. When the sleeve 212 is disposed about the floral grouping 94f, the sleeve 212 forms a wrapper 210 which provides a decorative packaging for the floral grouping 94f contained therein.

It will be appreciated that the sleeve 212 has sufficient flexibility but also sufficient rigidity to both remain in and sustain its general shape, thereby substantially surrounding and encompassing the floral grouping 94f.

As illustrated in FIGS. 26–28, the sleeve 212 may also extend over the outer peripheral surface 116f of a flower pot 110f. The sleeve may comprise at least a portion of a flower pot cover (if the upper portion 242 of the sleeve 212 tears away from the lower portion 244 of the sleeve 212 via vertical perforations 246 and/or circumferential perforations 248 extending about the sleeve 212 near or above the level of the open upper end 112f of the pot 110f, as illustrated in FIGS. 26–28) or, alternatively, the sleeve 212 may extend over a pot 110f already covered by a decorative cover 109f, the sleeve 212 often being torn away from the decorative cover 109f after shipment and delivery (not shown). The sleeve 212 usually has a bonding material 24f disposed thereupon such that the second end 216 of the sleeve 212 will connect to the pot 110f. Alternatively, a bonding material 24f may be disposed upon the outer peripheral surface 116f of the flower pot. In a further alternative, the bonding material 24f may be disposed on both the pot 110f and the sleeve 212. The flower pot 110f may contain a floral grouping 94f disposed therein.

It will be appreciated that the method of disposing a flower pot 110f into the sleeve 212 is generally substantially similar to the method described above for disposing a floral grouping 94f into a sleeve 212.

The Embodiment of FIG. 29

Shown in FIG. 29 and designated therein by the general reference numeral 250 is a wrapper for a floral grouping constructed from the optical effect material 10g, as shown in FIGS. 22–28 and described in detail herein previously. The wrapper 250 is identical to the sleeve 212 above, except that the wrapper 250 is a narrow tubular shape which is constructed to accommodate a floral grouping 94g comprising generally only a single bloom portion 96g and stem portion 98g.

The method of use of the wrapper 250 is identical to the method of use shown in FIGS. 22–25 and described in detail herein above.

Changes may be made in the construction and the operation of the various components, elements and assemblies described herein or in the steps or the sequence of steps of the methods described herein without departing from the spirit and scope of the invention as defined in the following claims.

What is claimed is:

1. A method of decoratively wrapping a floral grouping, comprising the steps of:
   providing an iridescent wrapping material comprising:
      an iridescent sheet of material having an upper surface and an opposing lower surface wherein each of the upper and lower surfaces provide an iridescent optical effect; and a transparent sheet of material laminated to at least one of the upper and lower surfaces of the iridescent sheet of material such that the iridescent optical effect of each of the upper and lower surfaces of the iridescent sheet of material is visible; and wrapping the iridescent wrapping material about the floral grouping so as to encompass at least a portion of the floral grouping and thereby provide a decorative wrapping about the floral grouping wherein the decorative wrapping provides an iridescent optical effect.

2. The method of claim 1 further comprising the steps of:

providing the iridescent wrapping material with a bonding material on a portion of one of the upper and lower surfaces; and wrapping the iridescent wrapping material about the floral grouping such that the bonding material engages the iridescent wrapping material to effect closure of the iridescent wrapping material around the floral grouping.

3. The method of claim 1 wherein in the step of providing the iridescent wrapping material, the iridescent sheet of material has a thickness in a range of from about 0.4 mils to about 0.9 mils and wherein the transparent sheet of material has a thickness in a range of from about 0.4 mils to about 0.9 mils.

4. The method of claim 1 wherein the transparent sheet of material is laminated to the iridescent sheet of material with a tinted bonding material.

5. A method of decoratively wrapping a floral grouping, comprising the steps of:

providing a sleeve formed of an iridescent sheet of material having an upper surface and an opposing lower surface wherein each of the upper and lower surfaces provides an iridescent optical effect and a transparent sheet of material laminated to at least one of the upper and lower surfaces of the iridescent sheet of material such that the iridescent optical effect of each of the upper and lower surfaces of the iridescent sheet of material is visible; and disposing the sleeve about the floral grouping so as to encompass at least a portion of the floral grouping and thereby provide a decorative wrapping about the floral grouping wherein the decorative wrapping provides an iridescent optical effect.

6. The method of claim 5 further comprising the steps of:

providing the sleeve with a bonding material on a portion of one of the upper and lower surfaces; and crimping the sleeve about a portion of the floral grouping along the bonding material such that portions of the sleeve overlap adjacent portions of the sleeve and the overlapping portions bondingly connect so as to secure the crimped portion of the sleeve in a crimped condition about the floral grouping.

7. The method of claim 5 wherein in the step of providing the sleeve, the iridescent sheet of material has a thickness in a range of from about 0.4 mils to about 0.9 mils and wherein the transparent sheet of material has a thickness in a range of from about 0.4 mils to about 0.9 mils.

8. The method of claim 5 wherein the transparent sheet of material is laminated to the iridescent sheet of material with a tinted bonding material.

9. A method of decoratively wrapping a flower pot, comprising the steps of:

providing an iridescent wrapping material comprising:
an iridescent sheet of material having an upper surface and an opposing lower surface wherein each of the upper and lower surfaces provides an iridescent optical effect; and a transparent sheet of material laminated to at least one of the upper and lower surfaces of the iridescent sheet of material such that the iridescent optical effect of each of the upper and lower surfaces of the iridescent sheet of material is visible; and forming the iridescent wrapping material about the flower pot so as to encompass at least a portion of the flower pot and thereby provide a decorative wrapping about the flower pot wherein the decorative wrapping provides an iridescent optical effect.

10. The method of claim 9 further comprising the steps of:

securing the iridescent wrapping material to the flower pot.

11. The method of claim 9 wherein in the step of providing the iridescent wrapping material, the iridescent sheet of material has a thickness in a range of from about 0.4 mils to about 0.9 mils and wherein the transparent sheet of material has a thickness in a range of from about 0.4 mils to about 0.9 mils.

12. The method of claim 9 wherein the transparent sheet of material is laminated to the iridescent sheet of material with a tinted bonding material.

13. A method of decoratively wrapping a flower pot, comprising the steps of:

providing an iridescent wrapping material, comprising:
an iridescent sheet of material having an upper surface and an opposing lower surface wherein each of the upper and lower surfaces provides an iridescent optical effect; and a transparent sheet of material laminated to at least one of the upper and lower surfaces of the iridescent sheet of material such that the iridescent optical effect of each of the upper and lower surfaces of the iridescent sheet of material is visible;

forming the iridescent wrapping material into a flower pot cover having a predetermined shape with a closed lower end, an opened upper end, and an object opening dimensioned to receive the flower pot extending through the opened upper end, the iridescent wrapping material having a plurality of overlapping folds formed between the upper end and the lower end, the iridescent wrapping material having an upper surface and a lower surface with at least one of the upper surface and the lower surface being a bondable surface such that the overlapping folds are fixed thereby enabling the iridescent wrapping material to retain the predetermined shape; and disposing the flower pot into the object opening of the flower pot cover such that the flower pot cover provides a decorative wrapping about the flower pot wherein the decorative wrapping provides an iridescent optical effect.

14. The method of claim 13 wherein in the step of providing the iridescent wrapping material, the iridescent sheet of material has a thickness in a range of from about 0.4 mils to about 0.9 mils and wherein the transparent sheet of material has a thickness in a range of from about 0.4 mils to about 0.9 mils.

15. The method of claim 13 wherein the transparent sheet of material is laminated to the iridescent sheet of material with a tinted bonding material.

* * * * *

UNITED STATES PATENT AND TRADEMARK OFFICE
CERTIFICATE OF CORRECTION

PATENT NO. : 5,701,720
DATED : Dec. 30, 1997
INVENTOR(S) : Donald E. Weder

It is certified that error appears in the above-identified patent and that said Letters Patent is hereby corrected as shown below:

The title page should be deleted and substitute therefor the attached title page.

United States Patent [19]

Weder

[11] Patent Number: 5,701,720
[45] Date of Patent: Dec. 30, 1997

[54] OPTICAL EFFECT MATERIAL AND METHODS

[75] Inventor: Donald E. Weder, Highland, Ill.

[73] Assignee: Southpac Trust International, Inc.

[21] Appl. No.: 454,474

[22] Filed: May 30, 1995

Related U.S. Application Data

[63] Continuation of Ser. No. 179,057, Jan. 7, 1994, Pat. No. 5,576,089, which is a continuation-in-part of Ser. No. 968,798, Oct. 30, 1992, Pat. No. 5,369,934, which is a continuation of Ser. No. 865,563, Apr. 9, 1992, Pat. No. 5,245,814, which is a continuation of Ser. No. 649,379, Jan. 31, 1991, Pat. No. 5,111,638, which is a continuation of Ser. No. 249,761, Sep. 26, 1988, abandoned, which is a continuation-in-part of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned.

[51] Int. Cl.$^6$ .......................... B65B 11/02; B65B 11/48; B65B 11/56; B65B 25/02
[52] U.S. Cl. ...................... 53/397; 53/399; 53/410; 53/464; 53/465
[58] Field of Search ...................... 53/397, 399, 462, 53/465, 415, 419, 464, 49, 410, 411, 412, 390, 456, 459; 206/423, 460; 229/87.01; 47/72, 41.01; 428/13, 142

[56] References Cited

U.S. PATENT DOCUMENTS

| Re. 31,780 | 12/1984 | Cooper et al. | 428/212 |
|---|---|---|---|
| 2,240,072 | 4/1941 | Hodgdon et al. | 428/142 |
| 2,774,187 | 12/1956 | Smithers | 47/41 |
| 2,989,828 | 6/1961 | Warp | 53/390 |
| 3,094,810 | 6/1963 | Kalpin | 47/37 |
| 3,150,031 | 9/1964 | Powell | 428/142 |
| 3,231,645 | 1/1966 | Bolomey | 264/73 |
| 3,271,922 | 9/1966 | Wallerstein et al. | 53/399 |
| 3,376,666 | 4/1968 | Leonard | 47/41 |
| 3,400,036 | 9/1968 | Hemrick et al. | 428/142 |
| 3,431,706 | 3/1969 | Stuck | 53/390 |
| 3,475,191 | 10/1969 | Lodge et al. | 428/142 |
| 3,481,663 | 12/1969 | Greenstein | 350/163 |
| 3,508,372 | 4/1970 | Wallerstein et al. | 53/399 |
| 3,549,405 | 12/1970 | Schrenk et al. | 428/142 |
| 3,554,434 | 1/1971 | Anderson | 229/55 |
| 3,616,192 | 10/1971 | Sinclair | 428/13 |
| 3,749,629 | 7/1973 | Andrews et al. | 428/142 X |
| 3,865,664 | 2/1975 | Neumann | 428/486 X |
| 3,922,440 | 11/1975 | Wegwerth et al. | 428/437 |
| 3,962,503 | 6/1976 | Crawford | 53/397 X |
| 4,162,343 | 7/1979 | Wilcox et al. | 428/212 |
| 4,189,868 | 2/1980 | Tymchuck et al. | 47/84 |
| 4,333,267 | 6/1982 | Witte | 47/84 |
| 4,400,910 | 8/1983 | Koudstaal et al. | 47/84 |
| 4,413,725 | 11/1983 | Bruno et al. | 206/45 |
| 4,520,064 | 5/1985 | Kanzelberger | 428/13 X |
| 4,530,863 | 7/1985 | Seeger | 428/13 |
| 4,699,820 | 10/1987 | Herr, Jr. et al. | 428/142 |
| 4,786,533 | 11/1988 | Crass et al. | 428/13 |
| 4,801,014 | 1/1989 | Meadows | 206/423 |
| 4,963,218 | 10/1990 | Rainey | 428/486 X |
| 5,008,143 | 4/1991 | Armanini | 428/207 |
| 5,089,318 | 2/1992 | Shetty et al. | 428/212 |
| 5,111,638 | 5/1992 | Weder | 53/397 |

(List continued on next page.)

FOREIGN PATENT DOCUMENTS 1204647  9/1970  United Kingdom .

OTHER PUBLICATIONS

Exhibit A—The Simple Solution For Those Peak vol. Periods, Speed Cover® 1989©, 4 pages, a brochure published by Highland Supply, 1111 Sixth St., Highland, IL 62249.
Exhibit B—Speed Sheets® And Speed Rolls, ©1990, 2 pages, a brochure published by Highland Supply, 1111 Sixth St., Highland, IL 62249.

*Primary Examiner*—Horace M. Culver
*Attorney, Agent, or Firm*—Dunlap & Codding, P.C.

[57] ABSTRACT

An optical effect material used for making shredded, flaked, die-cut and sheets of decorative materials. The optical effect material comprises an iridescent sheet and a light transmitting material connected together. Methods for using an optical effect material.

15 Claims, 12 Drawing Sheets

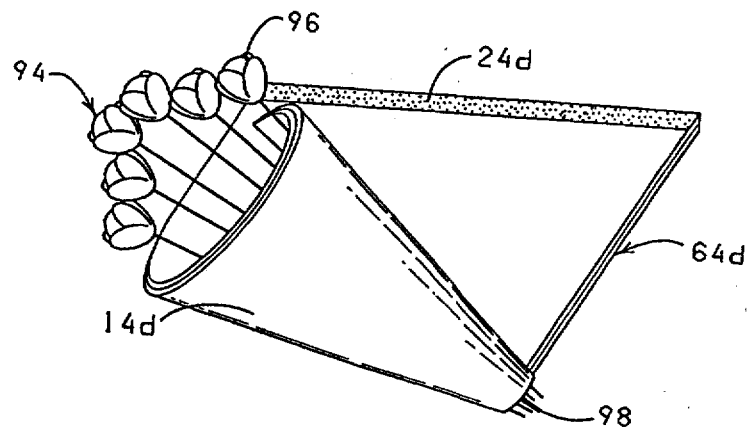

UNITED STATES PATENT AND TRADEMARK OFFICE
CERTIFICATE OF CORRECTION

PATENT NO. : 5,701,720

DATED : December 30, 1997

INVENTOR(S) : Donald E. Weder

It is certified that error appears in the above-identified patent and that said Letters Patent is hereby corrected as shown below:

Sheet 1 of 12, Figure 1, please insert drawing element --14-- as illustrated below:

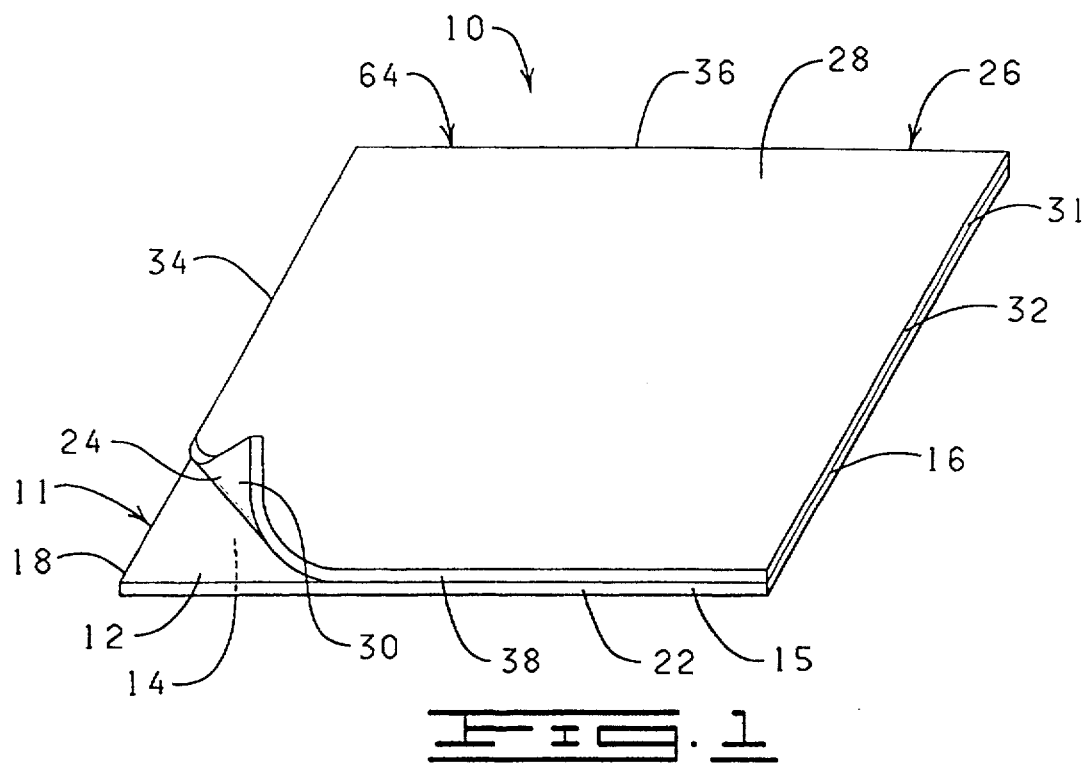

UNITED STATES PATENT AND TRADEMARK OFFICE
CERTIFICATE OF CORRECTION

PATENT NO. : 5,701,720                              Page 4 of 13

DATED : December 30, 1997

INVENTOR(S) : Donald E. Weder

It is certified that error appears in the above-identified patent and that said Letters Patent is hereby corrected as shown below:

Sheet 6 of 12, Figure 11, please delete drawing element "64" and substitute therefor --64c-- as illustrated below:

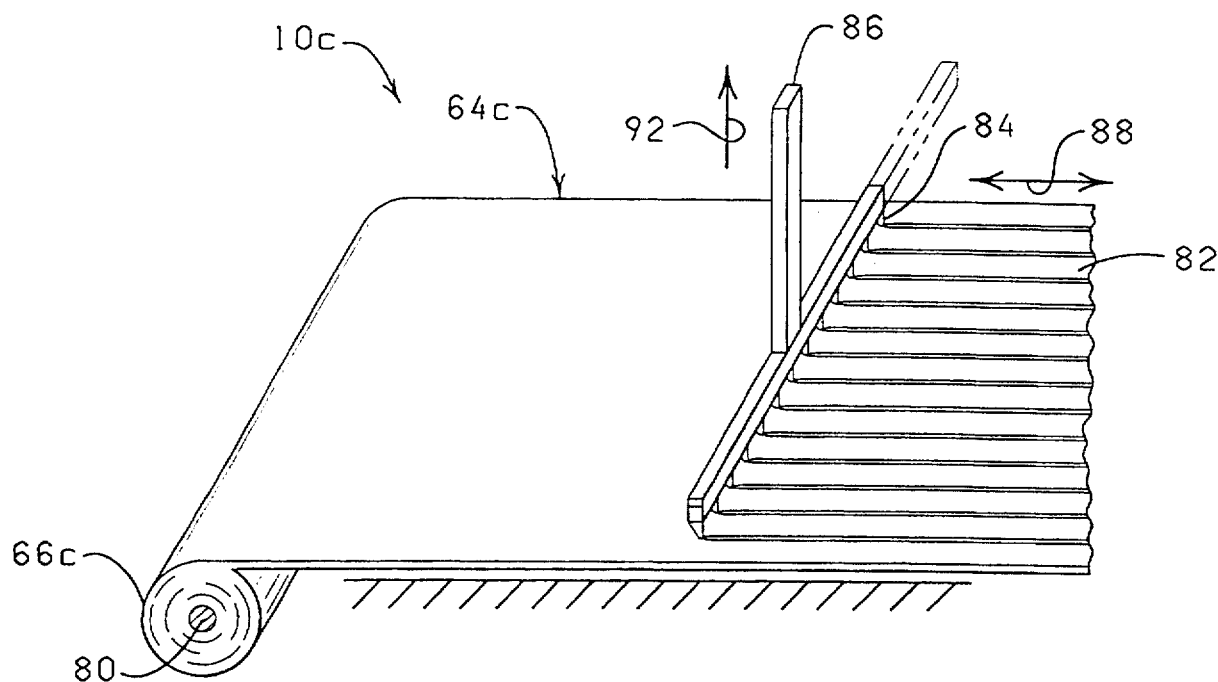

FIG. 11

UNITED STATES PATENT AND TRADEMARK OFFICE
CERTIFICATE OF CORRECTION

PATENT NO.   :   5,701,720

DATED   :   December 30, 1997

INVENTOR(S)   :   Donald E. Weder

It is certified that error appears in the above-identified patent and that said Letters Patent is hereby corrected as shown below:

```
Sheet 7 of 12, Figure 13, please delete drawing elements "32",
"12", "28", "34", and "18", and substitute therefor --32d--,
--12d--, --28d--, --34d--, and --18d-- as illustrated below:
```

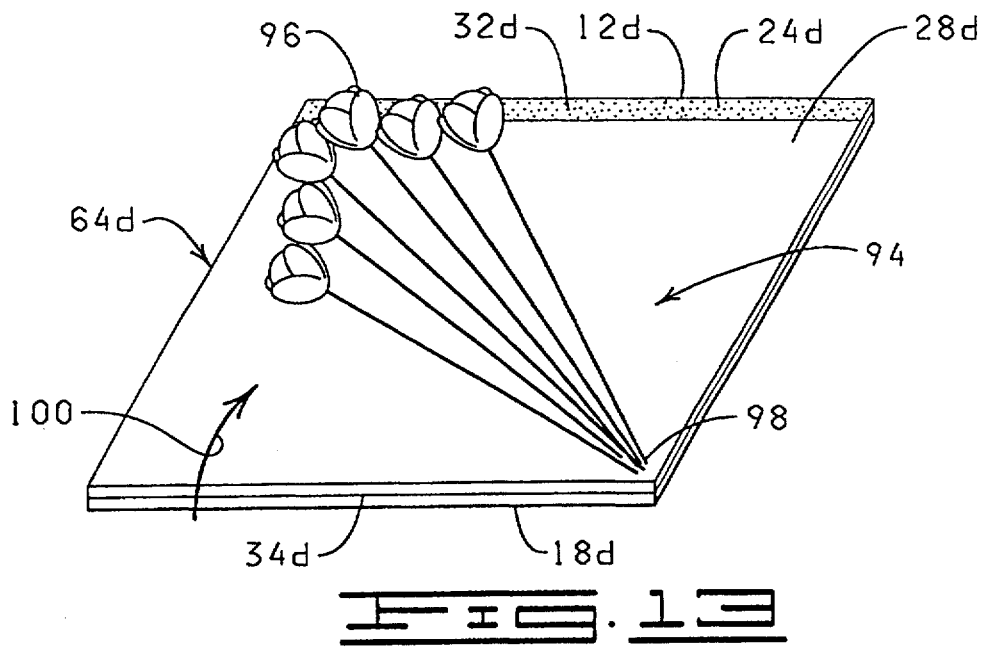

UNITED STATES PATENT AND TRADEMARK OFFICE
CERTIFICATE OF CORRECTION

Page 6 of 13

PATENT NO.      :   5,701,720

DATED           :   December 30, 1997

INVENTOR(S)     :   Donald E. Weder

It is certified that error appears in the above-identified patent and that said Letters Patent is hereby corrected as shown below:

Sheet 7 of 12, Figure 14, please delete drawing element "24e" and substitute therefor --24d-- as illustrated below:

Sheet 7 of 12, Figure 14, please delete drawing element "14", and substitute therefor --14d-- as illustrated below:

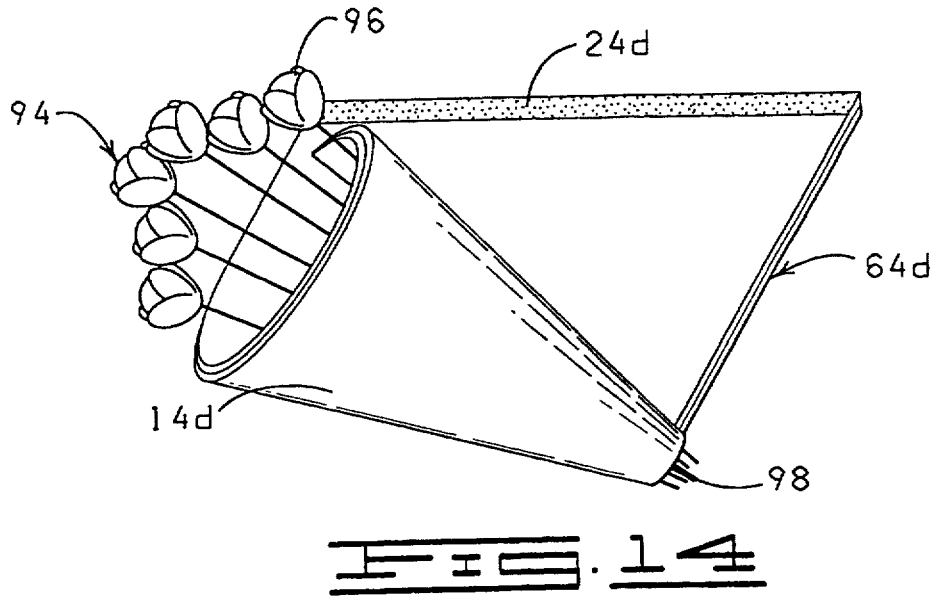

FIG.14

UNITED STATES PATENT AND TRADEMARK OFFICE
CERTIFICATE OF CORRECTION

PATENT NO. : 5,701,720     Page 7 of 13

DATED : December 30, 1997

INVENTOR(S) : Donald E. Weder

It is certified that error appears in the above-identified patent and that said Letters Patent is hereby corrected as shown below:

Sheet 9 of 12, Figure 17, please delete drawing element "28", and substitute therefor --28e-- as illustrated below:

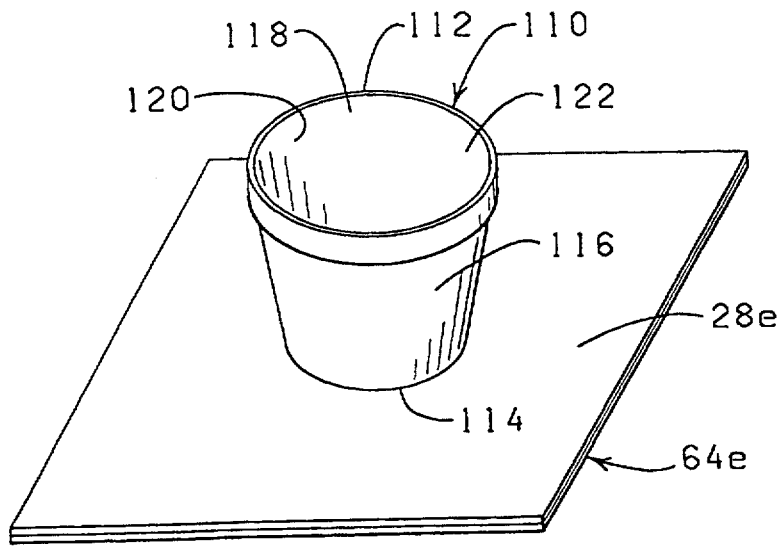

FIG. 17

UNITED STATES PATENT AND TRADEMARK OFFICE
CERTIFICATE OF CORRECTION

PATENT NO.    :    5,701,720

DATED         :    December 30, 1997

INVENTOR(S)   :    Donald E. Weder

It is certified that error appears in the above-identified patent and that said Letters Patent is hereby corrected as shown below:

Sheet 11 of 12, Figure 22, please insert drawing element --220-- for the opening as illustrated below:

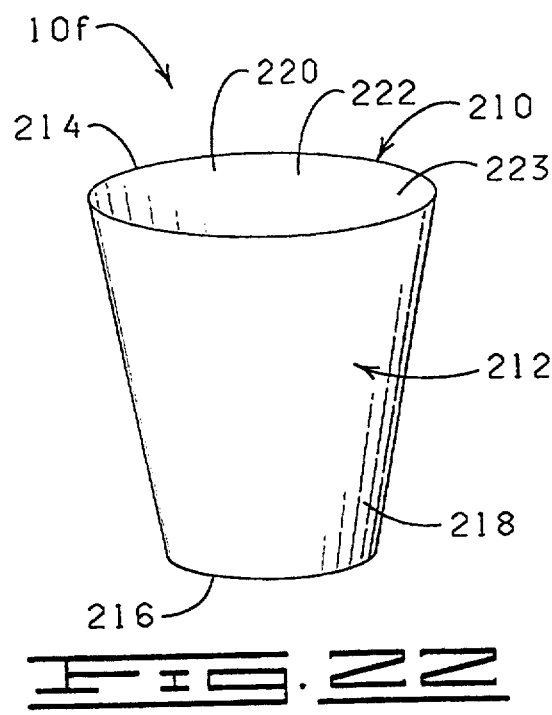

FIG. 22

UNITED STATES PATENT AND TRADEMARK OFFICE
CERTIFICATE OF CORRECTION

PATENT NO.    :   5,701,720

DATED         :   December 30, 1997

INVENTOR(S)   :   Donald E. Weder

It is certified that error appears in the above-identified patent and that said Letters Patent is hereby corrected as shown below:

Sheet 11 of 12, Figure 23, please insert drawing element --220-- for the opening as illustrated below:

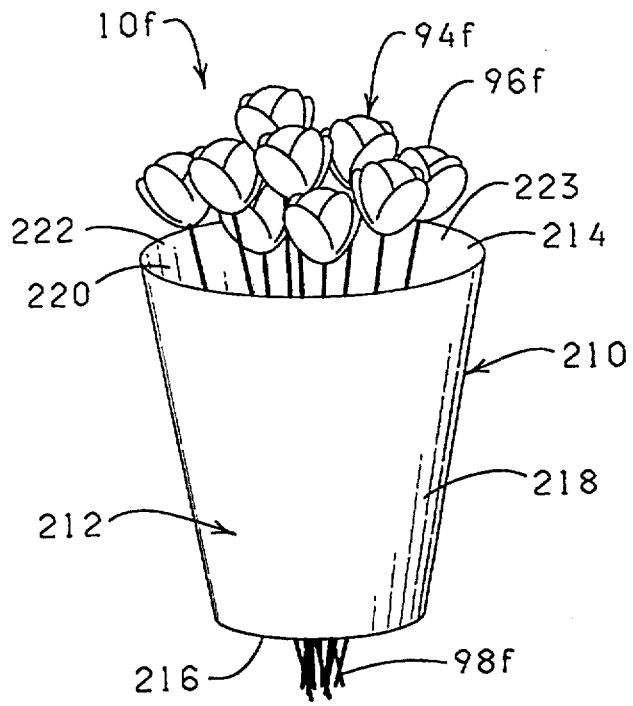

FIG. 23

UNITED STATES PATENT AND TRADEMARK OFFICE
CERTIFICATE OF CORRECTION

PATENT NO. : 5,701,720

DATED : December 30, 1997

INVENTOR(S) : Donald E. Weder

It is certified that error appears in the above-identified patent and that said Letters Patent is hereby corrected as shown below:

```
Sheet 11 of 12, Figure 24, please insert drawing element
--220-- for the opening as illustrated below:
```

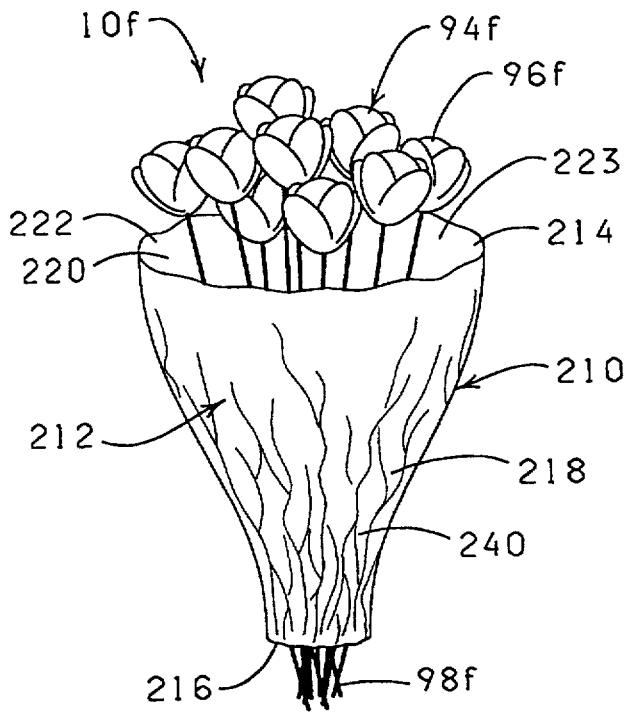

UNITED STATES PATENT AND TRADEMARK OFFICE
CERTIFICATE OF CORRECTION

PATENT NO.    :   5,701,720

DATED         :   December 30, 1997

INVENTOR(S)   :   Donald E. Weder

It is certified that error appears in the above-identified patent and that said Letters Patent is hereby corrected as shown below:

Sheet 11 of 12, Figure 25, please insert drawing element --220-- for the opening as illustrated below:

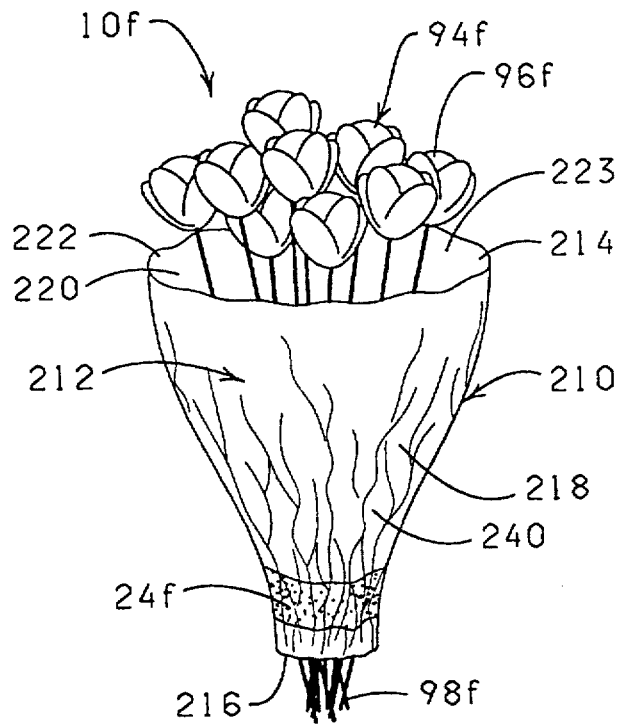

Fig. 25

UNITED STATES PATENT AND TRADEMARK OFFICE
CERTIFICATE OF CORRECTION

PATENT NO.   : 5,701,720                         Page 12 of 13

DATED        : December 30, 1997

INVENTOR(S)  : Donald E. Weder

It is certified that error appears in the above-identified patent and that said Letters Patent is hereby corrected as shown below:

Column 5, line 61, please delete "objects", and substitute therefor --Objects--.

Column 8, lines 3-4, please delete "synthetic organic polymer", and substitute therefor --Synthetic Organic Polymer--.

Column 11, line 6, please delete "20 and 36", and substitute therefor --20d and 36d--.

Column 11, line 7, please delete "22 and 38", and substitute therefor --22d and 38d--.

Column 11, line 13, please delete "34 and 18", and substitute therefor --34d and 18d--.

Column 11, line 64, please delete "108", and substitute therefor --102--.

Column 14, line 43, please delete "24f", and substitute therefor --94f--.

Column 14, line 43, please delete "12", and substitute therefor --212--.

UNITED STATES PATENT AND TRADEMARK OFFICE
CERTIFICATE OF CORRECTION

PATENT NO.    :   5,701,720

DATED         :   December 30, 1997

INVENTOR(S)   :   Donald E. Weder

It is certified that error appears in the above-identified patent and that said Letters Patent is hereby corrected as shown below:

Column 14, line 52, please delete "24f", and substitute therefor --94f--.

Column 15, line 51, please delete "12", and substitute therefor --212--.

Column 16, line 5, please delete "when", and substitute therefor --When--.

Signed and Sealed this

Thirteenth Day of October 1998

Attest:

BRUCE LEHMAN

*Attesting Officer*    *Commissioner of Patents and Trademarks*